US012047650B1

(12) United States Patent
Mahyar et al.

(10) Patent No.: US 12,047,650 B1
(45) Date of Patent: Jul. 23, 2024

(54) MACHINE LEARNING MODEL TO DETERMINE A PROPER SUBSET OF A MULTIMEDIA FILE FOR A VIEWER BASED ON THEIR INTEREST

(71) Applicant: Amazon Technologies, Inc., Seattle, WA (US)

(72) Inventors: Hooman Mahyar, Seattle, WA (US); Shivakumar Krishnamurthy, Bangalore (IN); Arjun Cholkar, Bothell, WA (US); Rafael Soltanovich, Woodland Hills, CA (US)

(73) Assignee: Amazon Technologies, Inc., Seattle, WA (US)

( * ) Notice: Subject to any disclaimer, the term of this patent is extended or adjusted under 35 U.S.C. 154(b) by 191 days.

(21) Appl. No.: 17/521,668

(22) Filed: Nov. 8, 2021

(51) Int. Cl.
*H04N 21/2187* (2011.01)
*H04N 21/25* (2011.01)
*H04N 21/472* (2011.01)
*H04N 21/845* (2011.01)

(52) U.S. Cl.
CPC ... *H04N 21/47217* (2013.01); *H04N 21/2187* (2013.01); *H04N 21/251* (2013.01); *H04N 21/8456* (2013.01)

(58) Field of Classification Search
CPC ......... H04N 21/47217; H04N 21/2187; H04N 21/251; H04N 21/8456
See application file for complete search history.

(56) References Cited

U.S. PATENT DOCUMENTS

| 2016/0150285 A1* | 5/2016 | Thomas | H04N 21/26283 725/50 |
| 2018/0124438 A1* | 5/2018 | Barnett | H04N 21/4826 |
| 2020/0311118 A1* | 10/2020 | Gupta | G06F 16/437 |
| 2021/0149955 A1* | 5/2021 | Cannon | H04N 21/8456 |

* cited by examiner

Primary Examiner — Hsiungfei Peng
(74) Attorney, Agent, or Firm — NICHOLSON DE VOS WEBSTER & ELLIOTT LLP

(57) ABSTRACT

Techniques for using a machine learning model to determine a proper subset of a multimedia file for a viewer based on their interest without the need to actively control a media player timeline are described. As one example, a computer-implemented method includes receiving a request at a content delivery service from a media player of a viewer to play a proper subset of a live multimedia file for a category of content of the live multimedia file without the viewer actively controlling a timeline of the media player of the viewer, determining an indication of a prior multimedia playing interaction of the viewer with the content delivery service, partitioning, by the content delivery service, the live multimedia file into a video portion, an audio portion, and a text portion, determining, by the content delivery service, one or more labels for the video portion, the audio portion, and the text portion, determining, by a machine learning model of the content delivery service, a proper subset of segments of the live multimedia file to send to the viewer based at least in part on the indication and the one or more labels, and live streaming the proper subset of segments of the live multimedia file to the media player of the viewer.

21 Claims, 14 Drawing Sheets

MACHINE LEARNING MODEL TO DETERMINE A PROPER SUBSET OF A MULTIMEDIA FILE FOR A VIEWER BASED ON THEIR INTEREST

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public. Service providers or content creators (such as businesses, artists, media distribution services, etc.) can employ one or more data centers to deliver content (such as web sites, web content, or other digital data) to users or clients.

BRIEF DESCRIPTION OF DRAWINGS

Various embodiments in accordance with the present disclosure will be described with reference to the drawings, in which.

DETAILED DESCRIPTION

Figure 1:
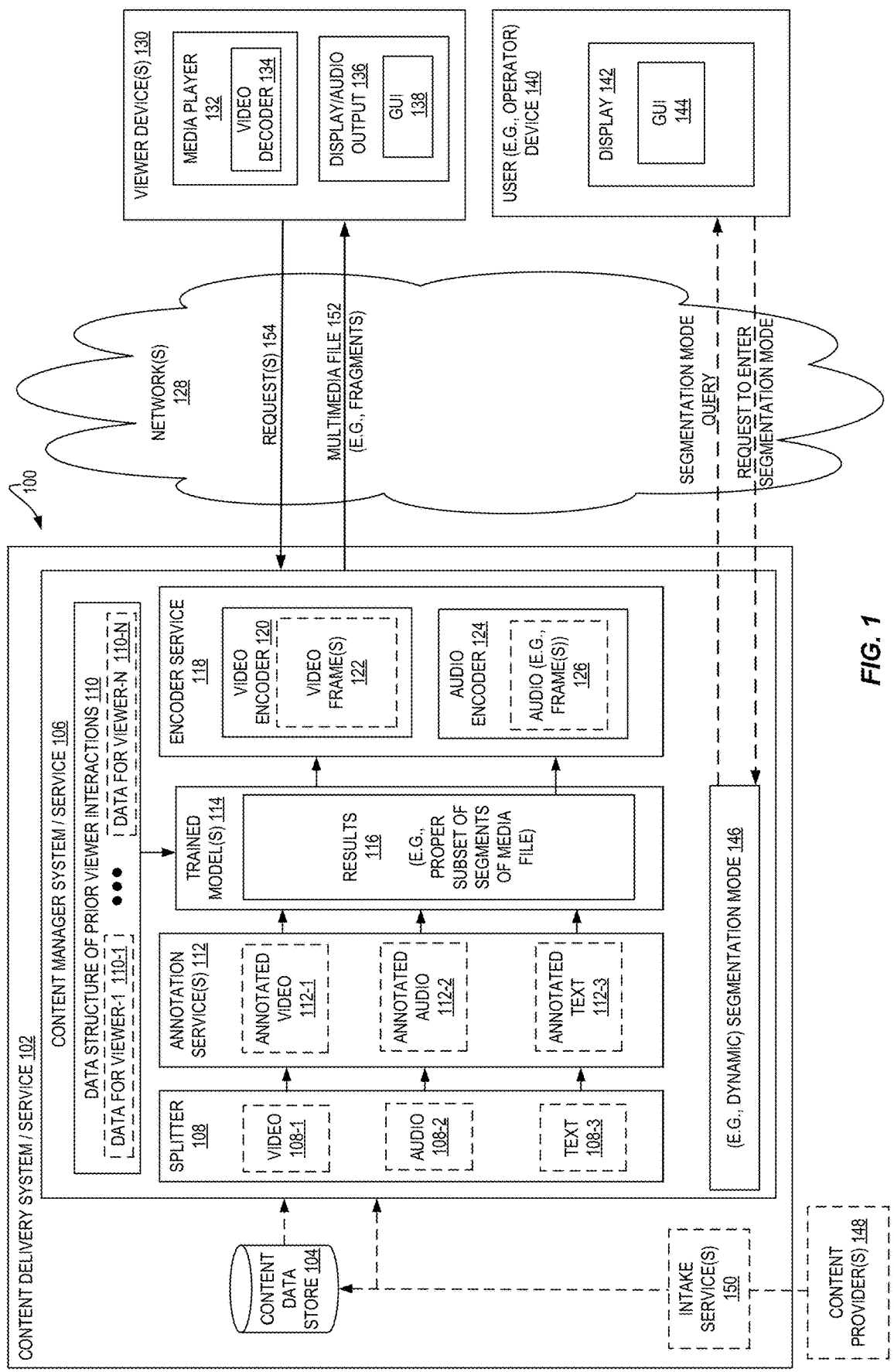
FIG. 1 is a diagram illustrating an environment including a content delivery system/service having a segmentation mode according to some embodiments.

Various embodiments of methods, apparatuses, systems, and non-transitory computer-readable storage media for determining a proper subset of a multimedia file for a viewer based on their interest are described. In certain embodiments, a machine learning model determines a proper subset (e.g., less than 2, 3, 4, 5, 6, or other number of minutes of) of a multimedia file (e.g., movie) for a viewer based on their interest(s) without the need to actively control a media player timeline. Certain embodiments use a set of annotation services (e.g., and tools) such as music detection, object detection, action detection (e.g., motion detection), shot change detection, and/or scene change detection to identify (e.g., classify) segments (e.g., interesting and noteworthy segments) of the multimedia file, e.g., using computer vision (CV), machine learning (ML), digital acoustic processing (DAP), and/or natural language understanding (NLU) techniques. In certain embodiments, the annotation output and a prior multimedia playing interaction of the viewer (e.g., indicating preference(s) of the viewer) are input into the machine learning model to identify a proper subset of segments that are used to generate a new (e.g., shorter in duration) multimedia file (e.g., a summary) from the multimedia file (e.g., movie) customized for that particular viewer. Thus, a first viewer and a second viewer (having different preferences than the first viewer) are presented with a different set of segments (e.g., different summaries) for a same multimedia file (e.g., movie) in certain embodiments. Certain embodiments herein highlight portion(s) of a multimedia file (e.g., movie) to generate a summary of the most interesting and/or noteworthy content. In certain embodiments, the machine learning model determines what content is most interesting and/or noteworthy for a particular viewer, e.g., based at least on a prior multimedia playing interaction of the viewer (e.g., indicating preference(s) of the viewer). Certain embodiments identify musical portion(s) of multimedia file (e.g., movie), e.g., to generate a summary of musical content.

Embodiments herein thus provide methods, apparatuses, systems, and non-transitory computer-readable storage media for determining a proper subset of a multimedia file for a viewer based on their interest. Such embodiments cannot be practically performed in the human mind or by a human using a pen and paper, for example, because a machine learning model is not practically performed in the human mind or by a human using a pen and paper. Instead of merely generating a same single non-customized summary (e.g., of highlights) for multiple viewers, the embodiments herein allow for a machine learning model (e.g., and not a human) to identify a (for example, unidentified and/or undetermined (e.g., at and/or before that time)) proper subset of segments that are used to generate a new (e.g., shorter in duration) "summary" multimedia file from the source multimedia file (e.g., movie)) customized for that particular viewer.

Embodiments herein enable customers of a content delivery service/system to be presented (e.g., and watch) specific portions of a multimedia file (e.g., movie) based on their interest without the need to actively control the player timeline. Embodiments herein utilize a set of (e.g., video) understanding techniques to offer these features by detecting key timecodes in a given multimedia file (e.g., video). In certain embodiments, a content delivery service/system includes functionality so that a viewer (e.g., customer) exclusively views (e.g., predefined) segments, e.g., highlight or musical segments. Additionally or alternatively, in certain embodiments, a content delivery service/system includes functionality so that a viewer (e.g., customer) is provided an opportunity to skip to the next segment (e.g., scene) with a higher likelihood of customer interest (e.g., based on prior customer interactions). Certain embodiments herein use a set of annotation services (e.g., and tools) to identify a proper subset of (e.g., interesting and noteworthy) segments of a multimedia file (e.g., video) by using computer vision (CV), machine learning (ML), digital acoustic processing (DAP), and/or natural language understanding (NLU) techniques. For example, to enable a "Skip This Scene" feature, certain embodiments herein annotate a multimedia file (e.g., movie) with a scene change detector and detect the exact timecodes of each scene. Certain embodiments herein apply CV and ML techniques to detect a proper subset of (e.g., interesting to that particular viewer) scenes and/or shots, e.g., to identify the highlight portion(s) and/or musical portion(s) of the multimedia file (e.g., movie). Certain embodiments herein are directed to a content delivery service/system that automatically (e.g., not involving a human and not practically performed in the human mind) determines (e.g., detects) a proper subset of a multimedia file (e.g., movie) for a viewer based on their particular interest(s), e.g., without the need for the viewer to actively control their media player's timeline. Embodiments herein improve the functioning of a computer-implemented content delivery service/system by allowing the content delivery service/system to determine a proper subset of a multimedia file (e.g., movie) for a viewer based on their particular interest(s), e.g., without the need for the viewer to actively control their media player's timeline.

FIG. 1 is a diagram illustrating an environment 100 including a content delivery system/service 102 having a segmentation mode 146 according to some embodiments. The depicted content delivery system/service 102 includes a content data store 104, which may be implemented in one or more data centers. As one example, a multimedia file (e.g., a video with corresponding audio) that is to be encoded is accessed from the content data store 104 by content manager system/service 106. In one embodiment, the video encoder 120 of the encoder service 118 is to encode the video into a plurality of video representations (e.g., video frames 122) and/or the audio encoder 124 of the encoder service 118 is to encode the audio (e.g., corresponding to the video of a single title or not corresponding to the video of a single title as discussed herein) into a plurality of audio representations (e.g., audio 126 (e.g., audio frames)). For example, with splitter 108 splitting the input file into a video portion 108-1, an audio portion 108-2, and/or a text (e.g., textual) portion 108-3.

In certain embodiments, when in (e.g., dynamic) segmentation mode 146, content manager system/service 106 is to determine (e.g., by machine learning model(s) 114), results 116, e.g., that identify a proper subset of segments of an input (e.g., live) multimedia file to send to the viewer device 130 (e.g., after encoding).

In certain embodiments, when in (e.g., dynamic) segmentation mode 146, annotation service(s) 112 of content manager system/service 106 are to annotate the input multimedia file, for example, to generate (i) annotations for the video 108-1 portion (e.g., to form the annotated video 112-1), (ii) annotations for the audio 108-2 portion (e.g., to form the annotated audio 112-2), and/or (iii) annotations for the text 108-3 portion (e.g., to form the annotated text 112-3). Examples of annotation service(s) 112 are described further in reference to FIG. 3. In certain embodiments, the annotations are labels, e.g., labels that are used to identify a category of content (e.g., highlight, musical, etc.).

In certain embodiments, when in (e.g., dynamic) segmentation mode 146, content manager system/service 106 identifies the particular viewer (e.g., viewer device 130 and/or account associated with that viewer) and looks up the corresponding data from data structure 110 that indicates prior interaction(s) with that viewer. In certain embodiments, the content manager system/service 106 maintains a separate entry (or set of entries) in the data structure 110 for each viewer (e.g., or viewer device or account), for example, data 110-1 for viewer "1", data 110-N for viewer "N", where N is any positive integer greater than 1.

In certain embodiments, (e.g., in response to a viewer's action) the machine learning model(s) 114 receives as inputs (i) the annotations from annotation service(s) 112 (e.g., annotated video 112-1, annotated audio 112-2, and/or annotated text 112-3) and (ii) the corresponding data from data structure 110 that indicates prior interaction(s) with that viewer, and then determines results 116. In certain embodiments, the results indicate (e.g., based on a corresponding score for each segment exceeding a threshold) a proper subset of segments of the (e.g., live) multimedia file to encode and/or send (e.g., live) to the viewer (e.g., viewer device 130) based at least in part on the annotations and the data from the data structure 110 (e.g., the data corresponding to the prior multimedia playing interaction of the viewer with the content delivery service).

In certain embodiments, the results 116 are encoded by encoder service 118 to generate a new multimedia file 152 (e.g., having a different (e.g., substantially shorter) duration that the input multimedia file). In certain embodiments, the audio 126 is not required to correspond to the video frame(s) 122 in the multimedia file 152, for example, it may be desirable to generate a new multimedia file 152 (e.g., highlights) to send to the viewer device 130 that includes audio from a different portion of the video that is to be displayed. For example, in one embodiment, the output media file 152 includes a proper subset of video segments and a corresponding proper subset of audio segments that are different than a proper subset of audio segments in the original (e.g., input) multimedia file for the proper subset of video segments.

In certain embodiments, content manager system/service 106 generates a manifest of the available video representations (e.g., stored in content delivery system/service 102) and form a superset manifest. In these embodiments, the content manager system/service 106 (e.g., packaging service thereof) then uses the superset manifest to generate a manifest identifying a proper subset of video and audio representations for a particular viewer (e.g., client) device 130 (e.g., based on the client's media player 132 (e.g., decoder 134 thereof), display 136 resolution, audio output 136 capabilities, and/or available bandwidth). In certain embodiments, the content is stored in the content delivery system/service 102 in two parts: (i) the manifest of all available media representations (e.g., their URL addresses and, optionally, other characteristics, and (ii) the media representations (e.g., stream of fragments) in a single (e.g., container) or multiple files. In one embodiment, a client device is to read (or store) a manifest (e.g., sent in response to a manifest request) before the viewer device may make a request 154 for the media from that manifest, and thus access media files (e.g., encoded video and corresponding encoded audio).

Depicted viewer device 130 includes a display 136 having a graphical user interface (GUI) 134, e.g., to display a query for requesting a multimedia file from content delivery system/service 102. In certain embodiments, viewer graphical user interface (GUI) 134 is an instance of viewer graphical user interface (GUI) 500 in FIG. 5, viewer graphical user interface (GUI) 600 in FIG. 6, or viewer graphical user interface (GUI) 700 in FIG. 7.

In certain embodiments, content manager system/service 106 adds secondary content (e.g., advertisement(s), additional information about the multimedia title, etc.) into a main content (e.g., into highlights). In one embodiment, encoder service 118 is to encode both the main content and secondary content, e.g., and the secondary content insertion service is to insert the secondary content into the main content. Content manager system/service 106 (e.g., secondary content insertion service) may utilize scene changes to insert content based at least in part on those scene change(s), e.g., scene boundaries.

In FIG. 1, content delivery system/service 102 is coupled to viewer device(s) 130 and user device 140 via one or more networks 128, e.g., a cellular data network or a wired or wireless local area network (WLAN).

In certain embodiments, the input multimedia file is received live (e.g., live video). In certain embodiments, an intake service 150 is included to intake a (e.g., live) video from content provider(s) 148. In certain embodiments, the input video is real-time encoded, e.g., for live (or perceptibly live) presentation. Events that are described herein as occurring in real-time or near real-time can happen as instantaneously as possible, limited by certain factors such as the time required for transferring data (e.g., requests and responses) between computing devices, and the ability of computer hardware and software to process information. Real-time (or near real-time) can also mean immediately, as it happens, e.g., in the context of a system that processes data, these terms may mean processing data as it is received as opposed to storing or persisting the data once received for processing later on.

The depicted content delivery system/service 102 includes an (optional) content data store 104, which may be implemented in one or more data centers. In certain embodiments, the media file (e.g., video file that is to be viewed by the viewer device 130) is accessed (for example, from the content data store 104 or directly from a content provider 148, e.g., as a live stream) by splitter 108, annotation service(s) 112, trained model(s) 114, and/or encoder service 118. In certain embodiments, content provider(s) 148 provides a (e.g., live) multimedia (e.g., video and audio) file directly to the content manager system/service 106 without utilizing the content data store 104.

In certain embodiments, the (e.g., client) viewer device(s) 130 requesting the media file (e.g., fragment(s) of media) from content delivery system/service 102 causes the content manager system/service 106 (e.g., video encoder services(s) 118 thereof) to encode the multimedia file, e.g., into a compressed format for transmittal on network(s) 128 to viewer device 130. In certain embodiments, the encoder service 118 generates one or more subsets (e.g., frames, fragments, segments, scenes, etc.) of the media file (e.g., video), e.g., beginning with accessing the media file and generating the requested media (e.g., fragment(s)). In certain embodiments, each fragment includes a plurality of video frames.

In certain embodiments, content delivery system/service 102 is to send a query (e.g., asking if the segmentation mode 146 is desired) to user (e.g., operator) device 140, for example, and the user device 140 (e.g., in response to a command from a user of the device 140) is to send a response (e.g., an indication to enter or not enter "segmentation" mode 146). Depicted user device 140 includes a display 142 having a graphical user interface (GUI) 144, e.g., to display a query for encoding system/service 106 to enter (or not) segmentation mode 146.

Figure 2:
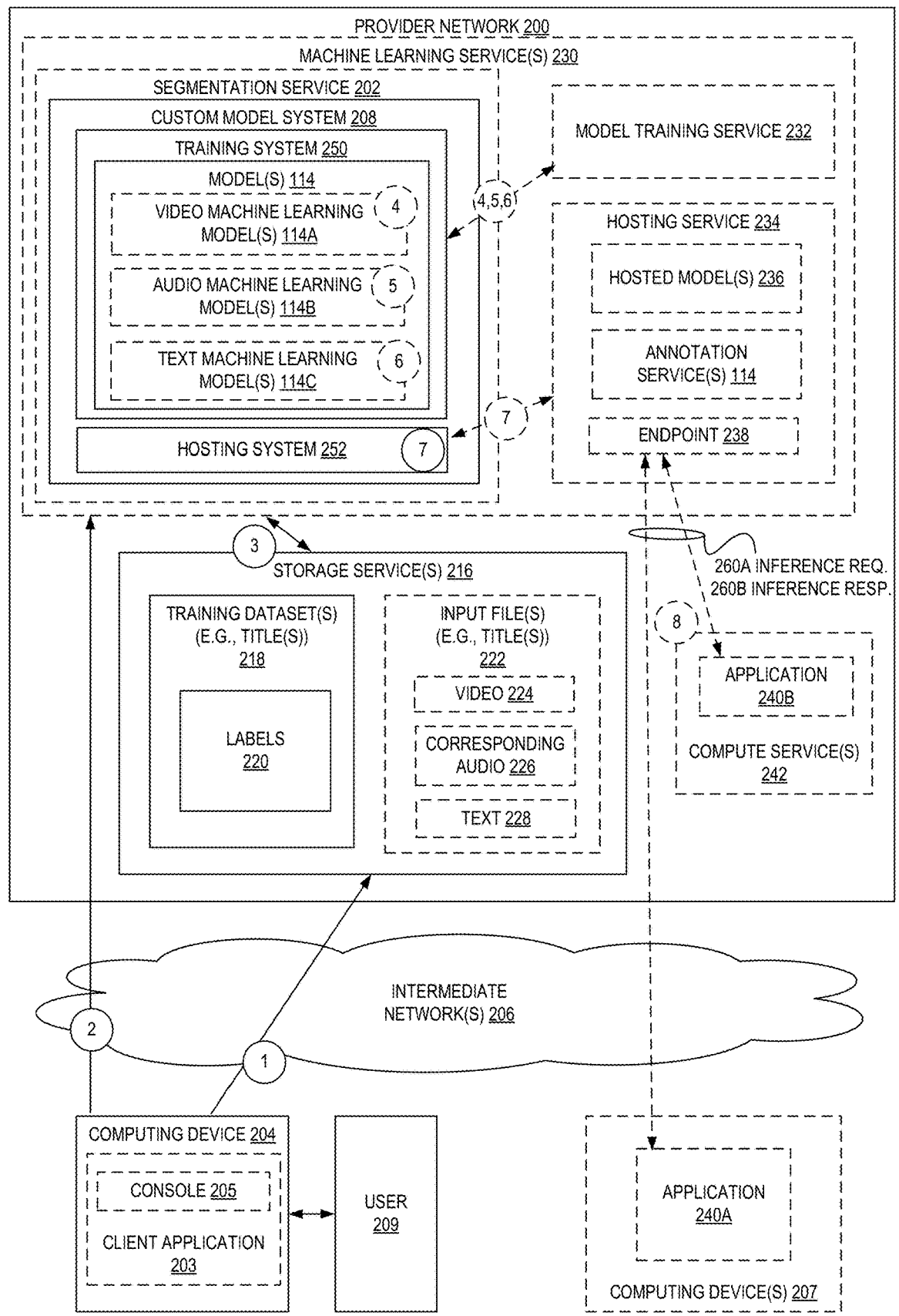
FIG. 2 is a diagram illustrating an environment for creating, training, and using one or more machine learning models according to some embodiments.

FIG. 2 is a diagram illustrating an environment for creating, training, and using an ensemble of machine learning models according to some embodiments. FIG. 2 includes a segmentation service 202, one or more storage services 216, one or more machine learning services 230, and one or more compute services 242 implemented within a multitenant provider network 200. Each of the segmentation service 202, one or more storage services 216, one or more machine learning services 230, one or more model training services 232, one or more hosting services 234, and one or more compute services 242 may be implemented via software, hardware, or a combination of both, and may be implemented in a distributed manner using multiple different computing devices.

A provider network 200 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances or a serverless code execution service that executes code (either of which may be referred to herein as a compute service 242), a storage service 216 that can store data objects, etc. The users (or "customers") of provider networks 200 may utilize one or more user accounts that are associated with a customer account, though these terms may be used somewhat interchangeably depending upon the context of use. Users may interact with a provider network 200 across one or more intermediate networks 206 (e.g., the internet) via one or more interface(s), such as through use of application programming interface (API) calls, via a console 205 implemented as a website or application, etc. The interface(s) may be part of, or serve as a front-end to, a control plane of the provider network 200 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 200 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

For example, in various embodiments, a "serverless" function may include code provided by a user or other entity—such as the provider network itself—that can be executed on demand. Serverless functions may be maintained within provider network 200 by an on-demand code execution service (which may be one of compute service(s) 242) and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions (e.g., as an application 240B) that can be executed on demand, without requiring the user to maintain dedicated infrastructure to execute the serverless function. Instead, the serverless functions can be executed on demand using resources maintained by the provider network 200. In some embodiments, these resources may be maintained in a "ready" state (e.g., having a pre-initialized runtime environment configured to execute the serverless functions), allowing the serverless functions to be executed in near real-time.

The segmentation service 202, in some embodiments, is a machine learning powered service that makes it easy for users to detect a proper subset of a multimedia file for a viewer based on their interest, e.g., to infer the probability that a particular segment (e.g., portion of a multimedia file) includes content that is interesting and/or noteworthy for that viewer based at least on a prior multimedia playing interaction of the viewer (e.g., indicating preference(s) of the viewer).

The training system 250, for example, may enable users to generate an ensemble of one or more machine learning models 114 (e.g., video machine learning model(s) 114A, audio machine learning model(s) 114B, and/or text machine learning model(s) 114C) that output results (e.g., feature vectors) for an input (for example, of a video 224 (e.g., and its corresponding audio 226 and/or corresponding text 228), e.g., from input file(s) 222. In certain embodiments, the training system 250 enables users to generate a classifier model 114 that outputs a value or other indication for a classification task from an input of a file 222 (for example, classification vectors, e.g., the value being a confidence value that an identified file includes a feature (e.g., object) (e.g., of a class as discussed herein) that is being searched for in the file).

Embodiments herein allow a customer to create one or more machine learning models 114 by supplying a training dataset 218 (for example, including labels 220, e.g., labels that indicate category(ies) of content).

In certain embodiments, trained model(s) 114 allow customers/users to, for inputs of an annotation (e.g., from annotation services 112) and a prior multimedia playing interaction of the viewer (e.g., indicating preference(s) of the viewer), infer a proper subset of segments that are used to generate a new (e.g., shorter in duration) multimedia file (e.g., a summary) from the multimedia file (e.g., movie)) customized for that particular viewer, e.g., as indicated by a probability that a certain segment (e.g., of a scene and/or shot) is interesting and/or noteworthy for that viewer.

In some embodiments, the segmentation service 202—via use of a custom model system 208—allows users to build and use model(s) 114.

At a high level, machine learning may include two major components that are required to be put in place in order to expose advertised functionality to the customer: (i) training and (ii) inference. Training may include the following responsibilities: training data analysis; data split (training, evaluating (e.g., development or validation), and/or testing data); model selection; model training; model evaluation; and status reporting. Inference may include the following responsibilities: model loading and hosting; and inference (e.g., synchronous and batch).

Training may include training a candidate algorithm into model(s) 114, e.g., into a video machine learning model 114A, an audio machine learning model 114-B, and/or a text machine learning model 114C, and respective configurations (e.g., coefficients and/or hyperparameters). Training may perform a grid search over the matrix of experiments (e.g., defined upfront) in search for the model and its parameters (e.g., hyperparameters) that performs best on the given dataset.

Thus, a user 209 may provide or otherwise identify data 218 (e.g., with labels 220) for use in creating a custom model. For example, as shown at circle (1), the user 209 may utilize a client application 203 executed by a computing device 204 (e.g., a web-application implementing a console 205 for the provider network 200, a standalone application, another web-application of another entity that utilizes the classification service 202 as a part of its backend, a database or mixed-SQL environment, etc.) to cause the computing device 204 to upload the data 218 to a storage location (e.g., provided by a storage service 216 such as an object storage service of a provider network 200).

The data 218 may be a columnar dataset that includes rows (or entries) of data values, where the data values may be arranged according to one or more columns (or attributes) and may be of a same datatype (e.g., one storing text). In some cases, the data 218 includes headings or other metadata describing names or datatypes of the columns, though in some cases this metadata may not exist. For example, some or all of the data 218 may have been provided by a user as a plaintext file (e.g., a comma-separated values (CSV) or tab-separated values (TSV) file), an exported database table or structure, an application-specific file such as a spreadsheet, etc.

For example, when a user 209 desires to train a model 114, this file (or files) may include labels corresponding to the file (e.g., video, audio, and/or text), e.g., with a label indicating category(ies) of content in the file.

Thereafter, at circle (2) the computing device 204 may issue one or more requests (e.g., API calls) to the machine learning service 230 that indicate the user's 209 desire to train one or more algorithms into model(s) 114, e.g., into a video machine learning model 114A, an audio machine learning model 114-B, and/or a text machine learning model 114C. The request may be of a type that identifies which type of model(s) are to be created or identifies that the machine learning service 230 itself is to identify the candidate model(s) 114, e.g., candidate video machine learning model 114A, candidate audio machine learning model 114-B, and/or candidate text machine learning model 114C. The request may also include one or more of an identifier of a storage location or locations storing the data 218 (e.g., an identifier of the labels 220), which may identify a storage location (e.g., via a Uniform Resource Locator (URL), a bucket/folder identifier, etc.) within the provider network 200 (e.g., as offered by a storage service 216) or external to the provider network 200, a format identifier of the data 218, a language identifier of the language of the labels 220, etc. In some embodiments, the request includes an identifier (e.g., from the user 209) of the candidate algorithm(s) themselves within the request.

Responsive to receipt of the request, the custom model system 208 of the machine learning service 230 is invoked and begins operations for training the corresponding type of model. For example, the custom model system 208 may identify what type of model is to be trained (e.g., via analyzing the method call associated with the request), the storage location(s) associated with the data 218 (e.g., labels 220), etc. Thus, the custom model system 208 may retrieve any stored data 218 elements as shown at circle (3), which may be from a storage location within the provider network 200 or external to the provider network 200.

In some embodiments, the training (at dotted circles (4), (5), and/or (6) in model(s) 114) of model(s) 114, e.g., video machine learning model 114A, audio machine learning model 114-B, and/or text machine learning model 114C, includes performing (at optional, dotted circles (4), (5), and/or (6)) by training service 232 of machine learning service 230 a particular training job (e.g., hyperparameter optimization tuning job), or the like.

In some embodiments, the hosting system 252 (at circle (7)) of the custom model system 208 may make use (at optional, dotted circle (7)) of a hosting service 234 of a machine learning service 230 to deploy a model as a hosted model 236 in association with an endpoint 238 that can receive inference requests from client applications 240A and/or 240B at circle (8), provide the inference requests 260A to the associated hosted model(s) 236, and provide inference results 260B (e.g., a prediction, including, but not limited to, segments predicted to be interesting and/or noteworthy for that viewer) back to applications 240A and/or 240B, which may be executed by one or more computing devices 207 outside of the provider network 200 or by one or more computing devices of a compute service 242 (e.g., hardware virtualization service, serverless code execution service, etc.) within the provider network 200. Inference results 260B may be displayed to a user and/or viewer (e.g., in a graphical user interface of the application) and/or exported as a data structure (e.g., in a selected format).

Figure 3:
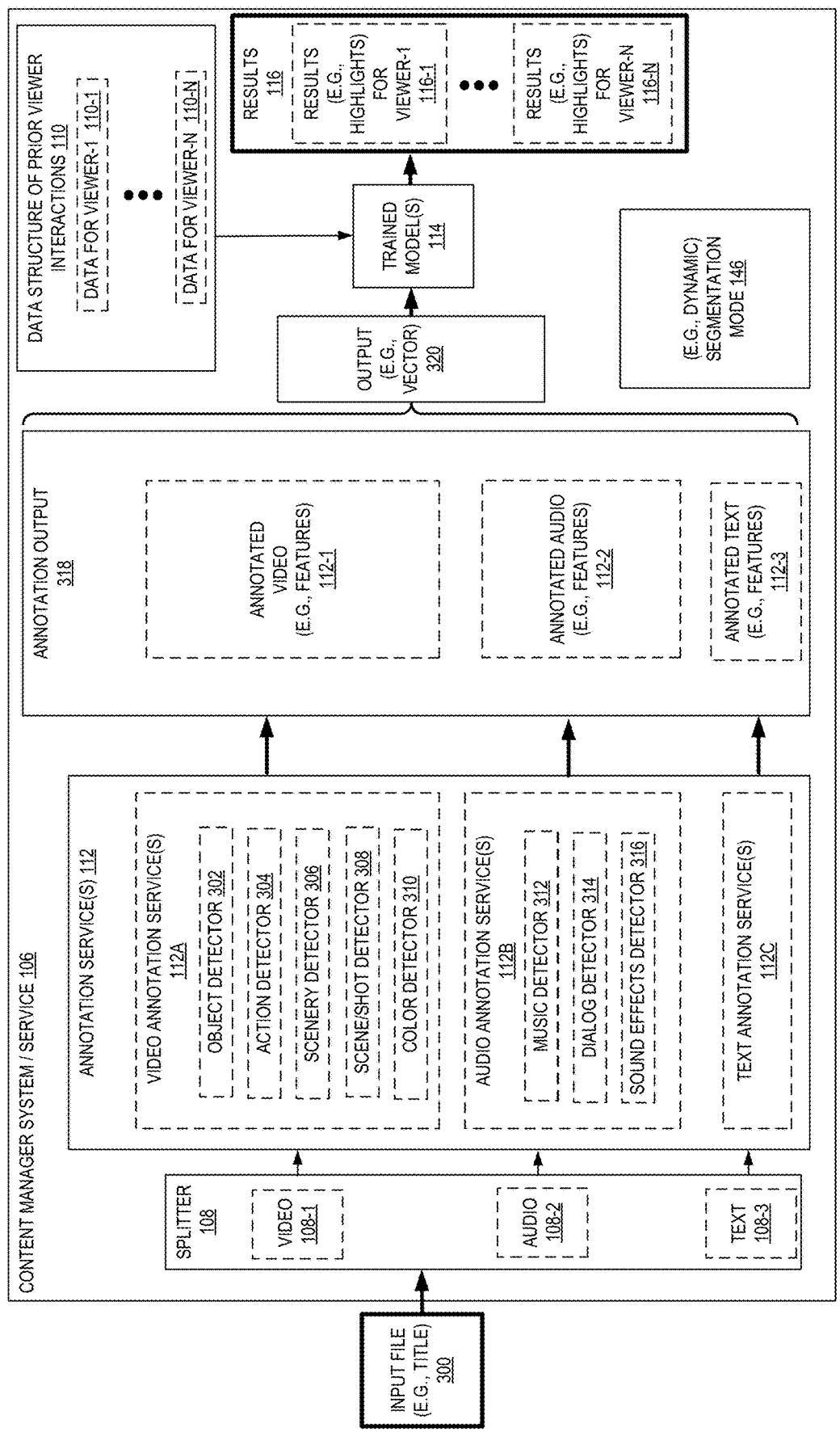
FIG. 3 is a diagram illustrating a content delivery system/service having annotation services(s) and a trained model(s) according to some embodiments.

FIG. 3 is a diagram illustrating a content delivery system/service 106 having annotation services(s) 112 and a trained model(s) 114 according to some embodiments. In certain embodiments, splitter 108 splits the input file (e.g., for a single title) into a video portion 108-1, an audio portion 108-2, and/or a text (e.g., textual) portion 108-3. In certain embodiments, the text portion includes a textual synopsis for the title, sub-titles for the title, closed captioning for the title, and/or metadata for the title (e.g., indicating certain content that is present in the title).

In certain embodiments, annotation service performs annotation on the input file 300. For example, with video annotation service(s) 112A to perform annotation on the video portion 108-1 of input file 300, with audio annotation service(s) 112B to perform annotation on the audio portion 108-2 of input file 300, and/or with text annotation service(s) 112C to perform annotation on the text portion 108-3 of input file 300.

In certain embodiments, video annotation services 112A generate data 112-1 (e.g., metadata) that indicates an object, person (e.g., celebrity), and/or face in the video of file (e.g., title) 300. In certain embodiments, video annotation services 112A include any one or combination of: object detector 302 to detect objects (e.g., vehicles, pets, etc.) in the video and/or generate data (e.g., metadata) that identifies those objects, action detector 304 to detect actions in the video (e.g., activities, such as, but not limited to, fighting, walking, running, blowing out a candle, etc.) and/or generate data (e.g., metadata) that identifies those actions, scenery detector 306 to detect scenery in the video (e.g., city, beach, mountains, wedding, etc.) and/or generate data (e.g., metadata) that identifies the scenery, scene/shot detector 308 to detect scenes and/or shots in the video and/or generate data (e.g., metadata) that identifies those scenes and/or shots, and/or color detector 310 to determine certain colors in the video and/or generate data (e.g., metadata) that identifies the colors.

In certain embodiments (e.g., in filmmaking and video production), the term "shot" may generally refer to a contiguous sequence of frames recorded (e.g., by a single camera) over an uninterrupted period of time, and the term "scene" may generally refer to a set of shots filmed in a particular context (e.g., the action in a single location and continuous time).

In certain embodiments, audio annotation services 112B generate data 112-2 (e.g., metadata) that indicates music, dialog, and/or sound effects in the audio of file (e.g., title) 300. In certain embodiments, audio annotation services 112B include any one or combination of: music detector 312 to detect music (e.g., artist, track name, etc.) in the audio and/or generate data (e.g., metadata) that identifies the music, dialog detector 314 to detect dialog (e.g., conversation, speech to an audience/monologue, profanity, etc.) in the audio and/or generate data (e.g., metadata) that identifies the dialog, and/or sound effects detector 316 to detect sound effects (e.g., conversation, profanity, etc.) in the audio and/or generate data (e.g., metadata) that identifies the sound effects.

In certain embodiments, text annotation services 112C generate data 112-3 (e.g., metadata) that indicates text in file (e.g., title) 300, e.g., text depicted in the video. In certain embodiments, text annotation services 112C correlates text to audio and/or video in the file 300.

In certain embodiments, annotation services 112 apply computer vision (CV), machine learning (ML), digital acoustic processing (DAP), and/or natural language understanding (NLU) techniques.

In certain embodiments, the annotation output 318 (e.g., annotated video 112-1, annotated audio 112-2, and annotated text 112-3 cumulatively as output 320) is provided as an input to trained model 114, e.g., along with input of prior viewer interaction data for that viewer from data structure 110, to generate results 116.

In certain embodiments, trained (e.g., fully connected) model 114 (e.g., semantic or knowledge network) generates different results 116 (e.g., and thus identifies different segments of file 300) for different viewers, for example, results (e.g., highlights) 116-1 for viewer-1, (e.g., different) results (e.g., highlights) 116-N for viewer-N, etc.

For example, it may be desirable to generate a new multimedia file (e.g., file 152 in FIG. 1) to send to a viewer that includes audio from a different portion of the video that is to be displayed. For example, in certain embodiments, the data 110-1 for viewer-1 indicates that viewer is interested in classic cars, so the output results 116-1 include one of more segments that refer to the car. Further to this example, in certain embodiments, a proper subset of video segments depicts a classic car and a corresponding proper subset of audio segments that are different than a proper subset of audio segments in the original (e.g., input) multimedia file for the proper subset of video segments, are included that discuss the classic car.

For example, it may be desirable to generate a first new multimedia file (e.g., file 152 in FIG. 1) to send to a first viewer that does not include romance from the multimedia file (e.g., movie) but does include action and adventure from the multimedia file (e.g., movie) (e.g., based on an indication (e.g., in data structure 110) of the first viewer not being interested in romance but being interested in action and adventure) and/or generate a different second new multimedia file (e.g., file 152 in FIG. 1) to send to a second viewer that does include romance from the multimedia file (e.g., movie) but does not include action and adventure from the multimedia file (e.g., movie) (e.g., based on an indication (e.g., in data structure 110) of the second viewer being interested in romance but not being interested in action and adventure). It should be understood that the above categories of content are merely examples and other categories may be utilized.

In certain embodiments, results 116 are used to take various actions, including, but not limited to, generating highlights (e.g., as in FIGS. 5 and 6) of the title (e.g., movie), indicating musical portion(s) of the title (e.g., movie) (e.g., as in FIG. 7), performing an accessibility assist (e.g., adding sign language, slowing down sub-titles and/or other on screen text (e.g., credits), and/or boosting the volume of dialog but not music or sound effects), and/or removing profanity and/or other mature content.

Embodiments herein thus allow for a personalized experience for a viewer through the creation of a "new" (e.g., truncated) multimedia presentation from the existing title that is informative, exciting, and/or interesting for that viewer based on their (e.g., automatically detected) interests, e.g., in contrast to a viewer manually skipping portions of a title they are not interested in and in contrast to a pre-existing highlight multimedia file (e.g., video) that is not customized for that single viewer.

In certain embodiments, for sports content (e.g., a live sporting event), results 116 include at least the scoring events.

In certain embodiments, for live streamed content (e.g., live streaming of a live sporting event), the results 116 are one or more (e.g., "customized" for that viewer) highlights of a previously streamed subset of the live stream (e.g., live multimedia file) that was not transmitted to the media player of the viewer, for example, where the request to view the content indicates the viewer is late to a start of the live streaming of the live multimedia file.

In certain embodiments, for a multiple season series (e.g., with multiple episodes in each season), the results 116 are one or more (e.g., "customized" for that viewer) highlights of a previous season or seasons, for example, where the request to view the content indicates the viewer is requesting to watch a next season of the multiple season series.

In certain embodiments, content delivery system/service 106 is to receive an input file 300 (e.g., title) from training dataset(s) 218 in FIG. 2 along with annotations (e.g., label (s)) to train model.

In certain embodiments, trained model 114 is to receive an input file 300 (e.g., title) having a video 224, corresponding audio 226, and/or text 228 from input file(s) 222 in FIG. 2 (e.g., but without annotations (e.g., label(s)) during the use of the trained model 114.

Figure 4:
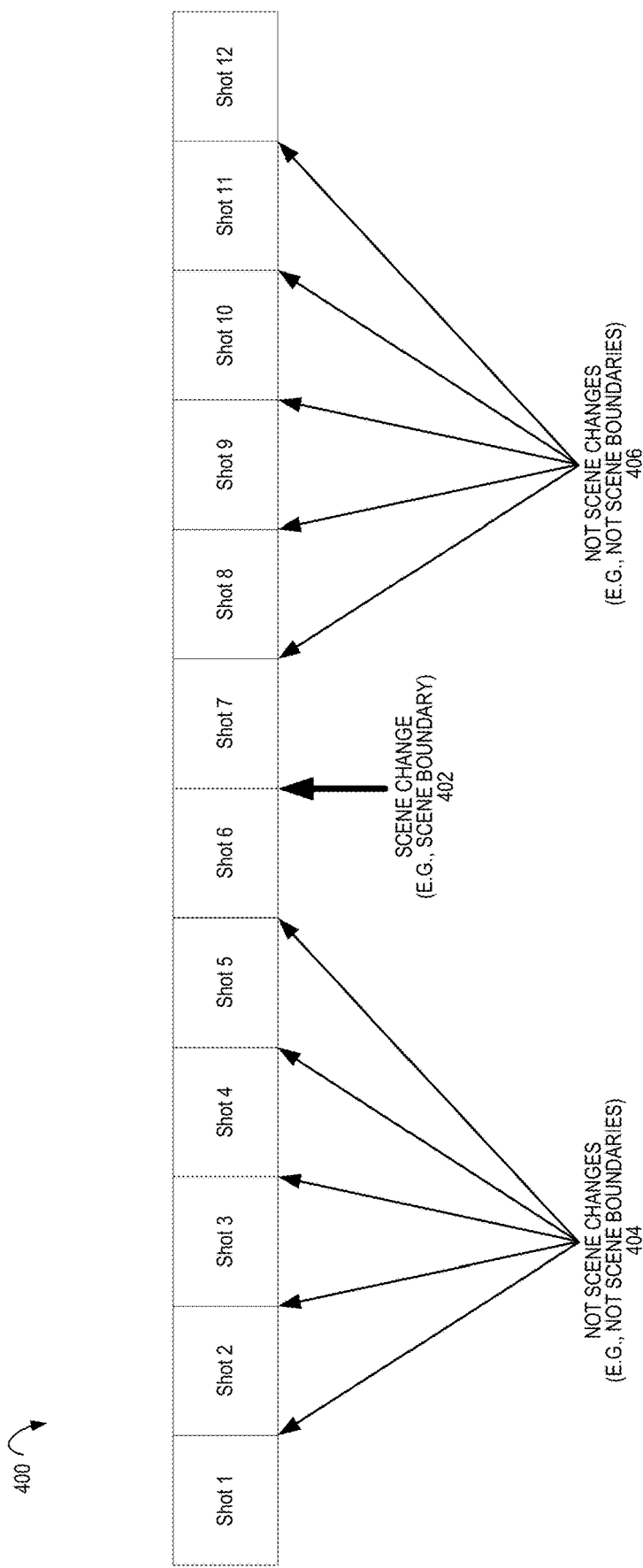
FIG. 4 is a diagram illustrating a plurality of shots of a video having a scene change therein according to some embodiments.

FIG. 4 is a diagram 400 illustrating a plurality of shots of a video having a scene change therein according to some embodiments. Although the plurality of shots are shown as twelve shots, it should be understood that any number of shots may be present in a title (e.g., video). Thus, each of the other shot boundaries in this proper subset of (e.g., 12) shots of the title can be marked as (i) "not scene changes" 404 for the previous (e.g., five) shots boundaries before the shot boundary of the scene change 402 (e.g., with the first shot (shot 6) of the scene change 402 marking an end of a first scene) and/or (ii) "not scene changes" 406 for the next five shots after the shot boundary of the scene change 402 (e.g., with the second, later shot (shot 7) of the scene change 402 marking a beginning of a second, next scene).

Figure 5:
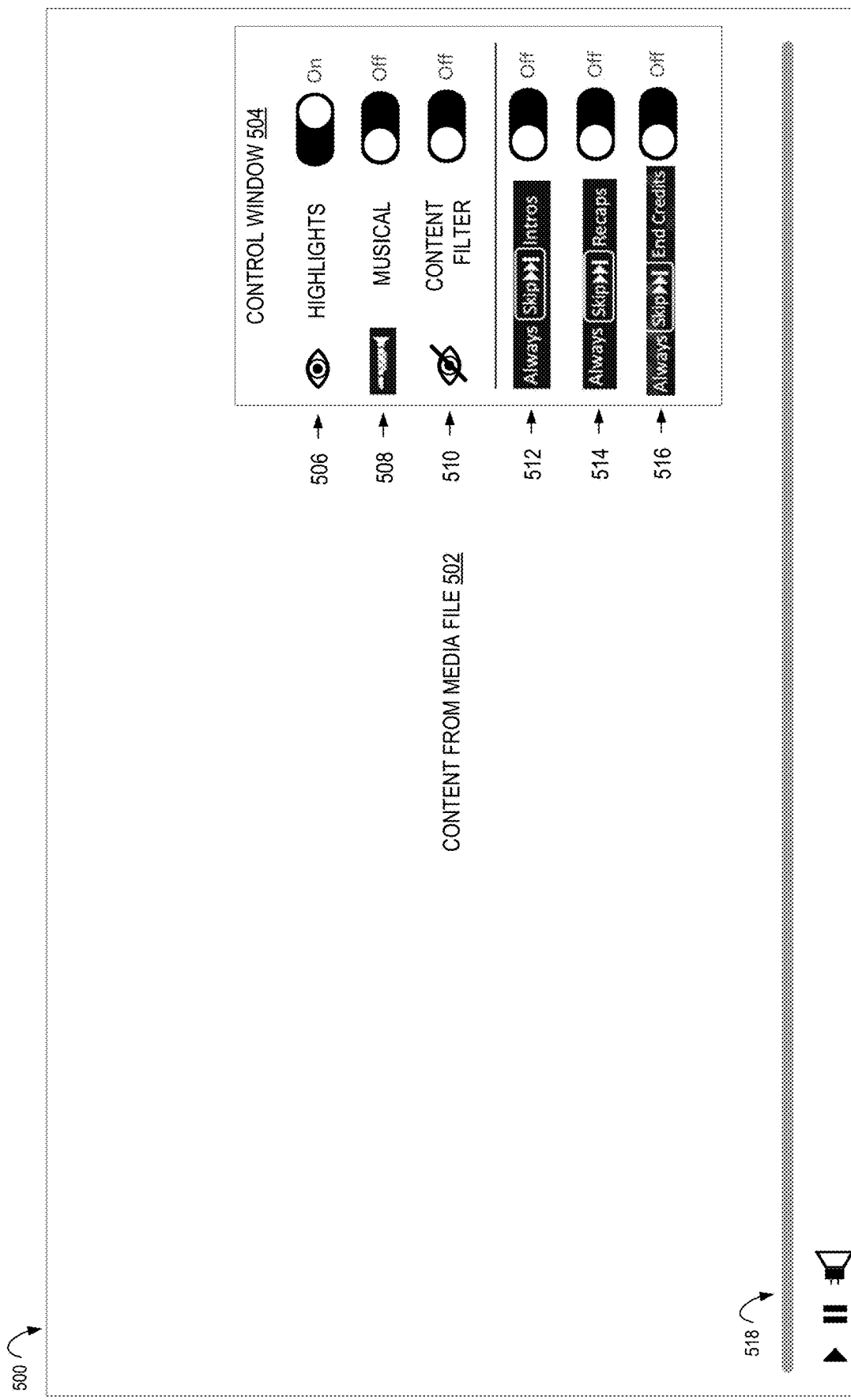
FIG. 5 is a diagram illustrating a viewer graphical user interface for setting a content delivery system/service to certain modes for categories of content according to some embodiments.

FIG. 5 is a diagram illustrating a viewer graphical user interface 500 for setting a content delivery system/service (e.g., content delivery system/service 102) to certain modes for categories of content according to some embodiments. In certain embodiments, graphical user interface 500 is overlaid (e.g., with some level of transparency of the overlay) onto content from media file 502, e.g., with timeline 518 and corresponding player control interface element(s) (shown as play, pause, and a speaker for volume control, but may include other controls such as fast forward or reverse, skip chapters, etc.). In certain embodiments, control window 504 is presented to a viewer (e.g., on display 136 in FIG. 1) to allow the viewer to select one or more interface elements (shown as a toggle). An interface element, may include, but is not limited to, a thumbs up (or down), checkbox, button, dropdown menu, etc.

In certain embodiments, control window 504 includes a highlights section 506 to control the display (e.g., and determination) of highlights. In certain embodiments, selecting an indication in highlights section 506 that the viewer desires to view highlights of a multimedia file being requested for viewing causes a command to be sent to a content delivery system/service 102 having a segmentation mode 146 (e.g., content manager system/service 106 thereof), e.g., and the command causes the content delivery system/service 102 (e.g., content manager system/service 106) to determine a highlight (e.g., one or more highlights) as disclosed herein. In certain embodiments, the timeline 518 is only for those highlights. In certain embodiments, the timeline is for the entire multimedia file that the highlights were generated from, e.g., but the timeline indicator automatically moves to the next segment of highlights.

In certain embodiments, control window 504 includes a musical section 508 to control the display (e.g., and determination) of musical segments of the multimedia file. In certain embodiments, selecting an indication in musical section 508 that the viewer desires to view the musical sections of a multimedia file being requested for viewing causes a command to be sent to a content delivery system/service 102 having a segmentation mode 146 (e.g., content manager system/service 106 thereof), e.g., and the command causes the content delivery system/service 102 (e.g., content manager system/service 106) to determine one or more musical segments as disclosed herein.

In certain embodiments, control window 504 includes a content filter section 510 to control the display or not (e.g., and determination) of categories (e.g., mature content, profanity, etc.) of segments of the multimedia file. In certain embodiments, selecting an indication in content filter section 510 that the viewer desires to not view those categories (e.g., mature content, profanity, etc.) of segments of a multimedia file being requested for viewing causes a command to be sent to a content delivery system/service 102 having a segmentation mode 146 (e.g., content manager system/service 106 thereof), e.g., and the command causes the content delivery system/service 102 (e.g., content manager system/service 106) to determine one or more segments likely to have those category/categories of content (e.g., mature content, profanity, etc.).

In certain embodiments, control window 504 includes a skip introduction (into) section 512 to control the skipping of introduction portions of a multimedia file. In certain embodiments, selecting an indication in skip introduction (intro) section 512 that the viewer desires to not view an introduction portion of a multimedia file being requested for viewing causes a command to be sent to a content delivery system/service 102 having a segmentation mode 146 (e.g., content manager system/service 106 thereof), e.g., and the command causes the content delivery system/service 102 (e.g., content manager system/service 106) to determine one or more segments likely to have introduction content.

In certain embodiments, control window 504 includes a skip recap section 514 to control the skipping of recap (e.g., a static recap that is already part of the multimedia file) portions of a multimedia file. In certain embodiments, selecting an indication in skip recap section 514 that the viewer desires to not view a recap portion of a multimedia file being requested for viewing causes a command to be sent to a content delivery system/service 102 having a segmentation mode 146 (e.g., content manager system/service 106 thereof), e.g., and the command causes the content delivery system/service 102 (e.g., content manager system/service 106) to determine one or more segments likely to have recap content.

In certain embodiments, control window 504 includes a skip end credit section 516 to control the skipping of end credits portions of a multimedia file. In certain embodiments, selecting an indication in skip end credits section 514 that the viewer desires to not view an end credits portion of a multimedia file being requested for viewing causes a command to be sent to a content delivery system/service 102 having a segmentation mode 146 (e.g., content manager system/service 106 thereof), e.g., and the command causes the content delivery system/service 102 (e.g., content manager system/service 106) to determine one or more segments likely to have end credit content.

Figure 6:
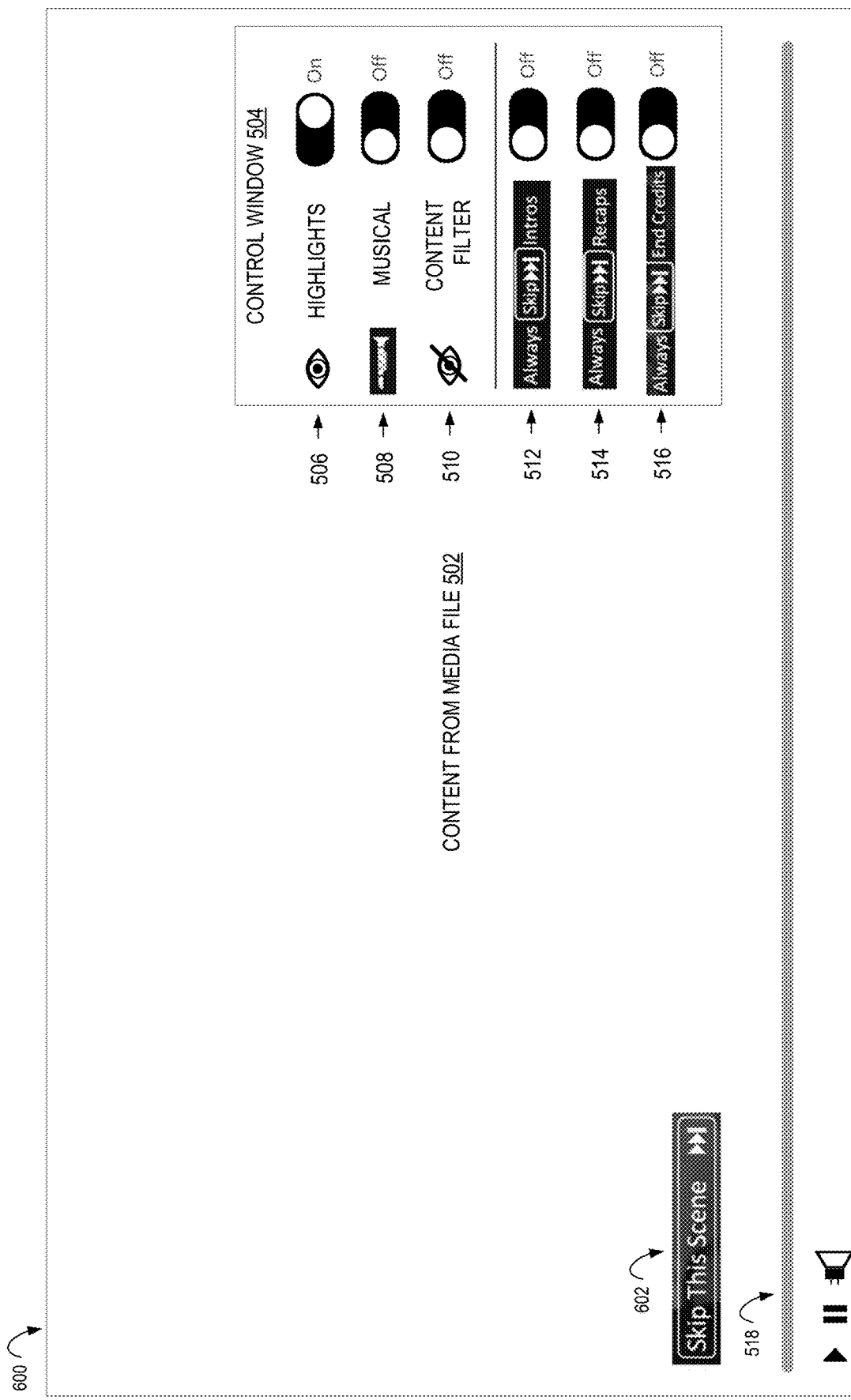
FIG. 6 is a diagram illustrating a viewer graphical user interface for setting a content delivery system/service to a highlight mode with optional skip control according to some embodiments.

FIG. 6 is a diagram illustrating a viewer graphical user interface 600 for setting a content delivery system/service to a highlight mode with optional skip control according to some embodiments. In certain embodiments, viewer graphical user interface 600 includes a skip this scene interface element 602 to allow the viewer to skip a scene in a highlights multimedia file (e.g., displayed as content 502) generated by content delivery system/service 102 having a segmentation mode 146 (e.g., content manager system/service 106 thereof), e.g., and the timeline indicator automatically moves to the next scene of the highlights.

Figure 7:
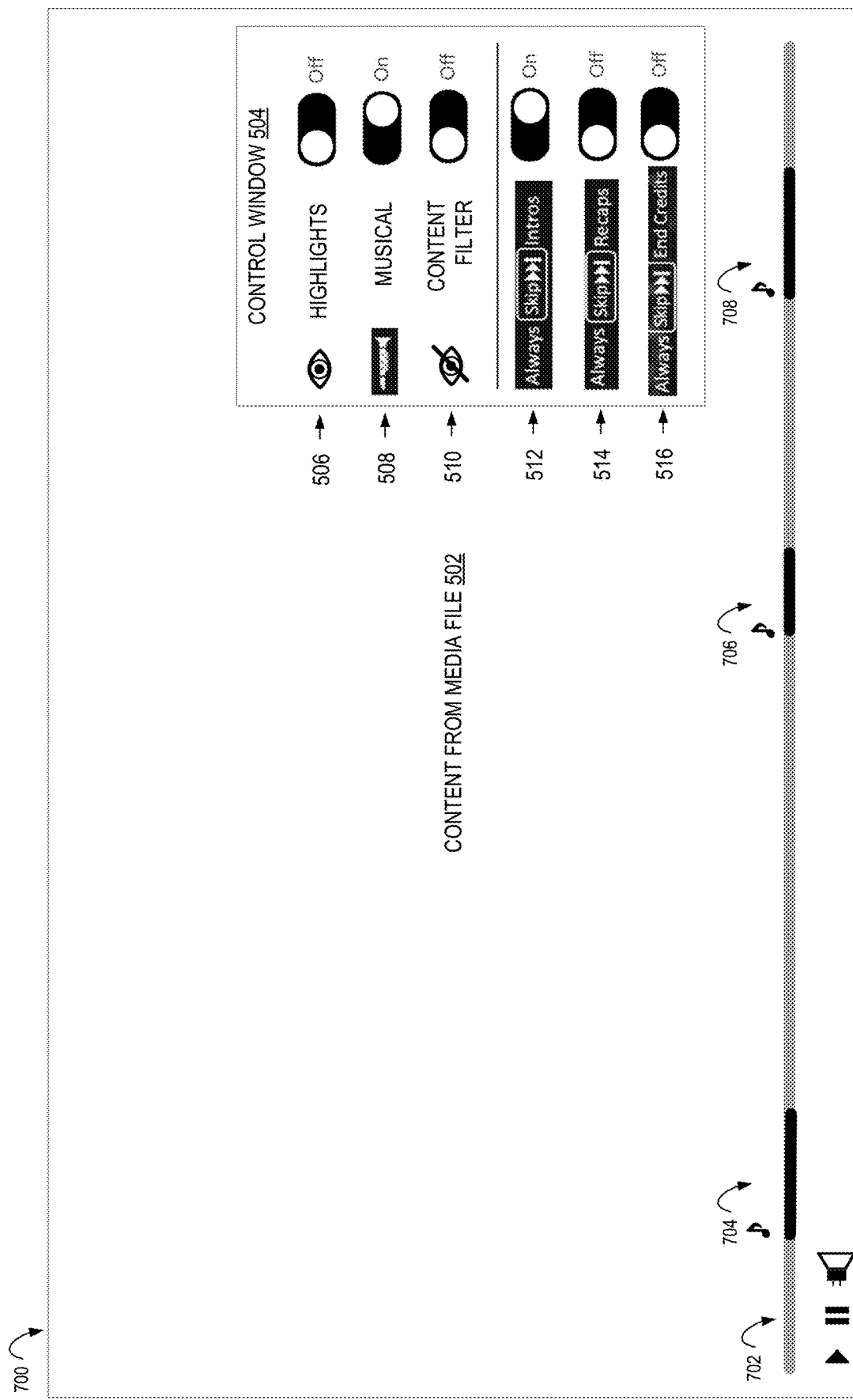
FIG. 7 is a diagram illustrating a viewer graphical user interface for setting a content delivery system/service to a musical mode according to some embodiments.

FIG. 7 is a diagram illustrating a viewer graphical user interface 700 for setting a content delivery system/service to a musical mode according to some embodiments. In certain embodiments, viewer graphical user interface 700 includes a plurality of corresponding proper subsets of musical parts (e.g., separated by non-musical parts) of the media file indicated at 704, 706, and 708 (three parts is an example, and other plurality of musical parts, a single musical part, or no musical parts may be present in a multimedia source file (e.g., single title)) on timeline 702 (shown optionally with a music note to further distinguish what type of content is being shown here), for example, in response to selecting the indication in musical section 508 that the viewer desires to view the musical sections of a multimedia file being requested for viewing, e.g., and that causing a command to be sent to a content delivery system/service 102 having a segmentation mode 146 (e.g., content manager system/service 106 thereof), e.g., and the command causes the content delivery system/service 102 (e.g., content manager system/service 106) to determine the one or more musical segments as disclosed herein.

Figure 8:
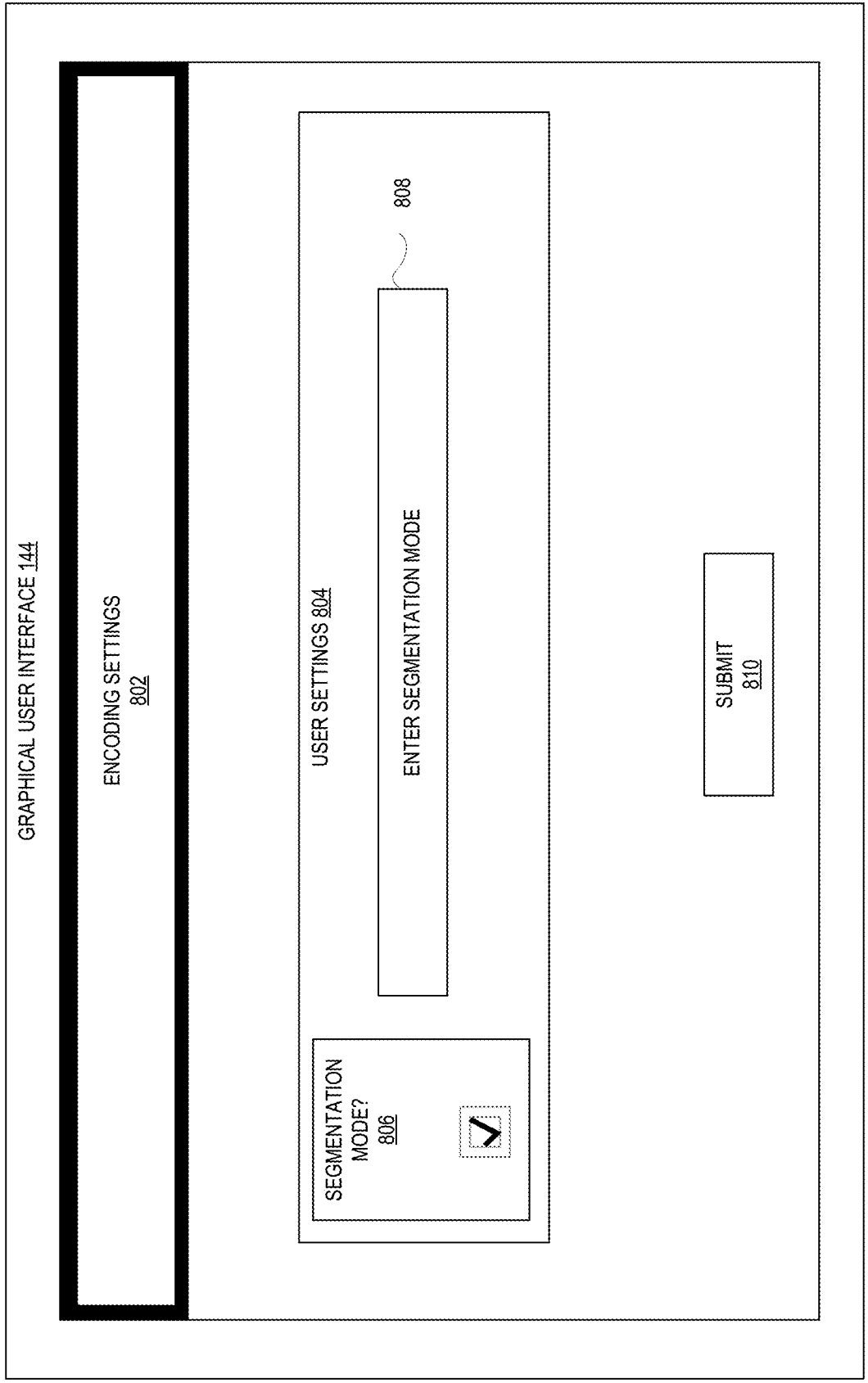
FIG. 8 is a diagram illustrating a graphical user interface for setting a content delivery system/service to a segmentation mode according to some embodiments.

FIG. 8 is a diagram illustrating a graphical user interface 144 for setting a content delivery system/service to a segmentation mode according to some embodiments. Depicted graphical user interface 144 includes a field 802 that is customizable with text to indicate that these are encoding settings, a field 804 that is customizable with text to indicate that these are user settings, an interface element 806 that, when selected, will cause the content delivery system/service to enter segmentation mode, and a field 808 that is customizable with text to indicate that selecting the interface element 806 is to cause entry into segmentation mode. A user may click the submit interface element 810 to (e.g., cause a command to be sent that causes) entry of a content delivery system/service into segmentation mode (e.g., segmentation mode 146 in the figures). An interface element, may include, but is not limited to, a thumbs up (or down), checkbox, button, dropdown menu, etc.

Figure 9:
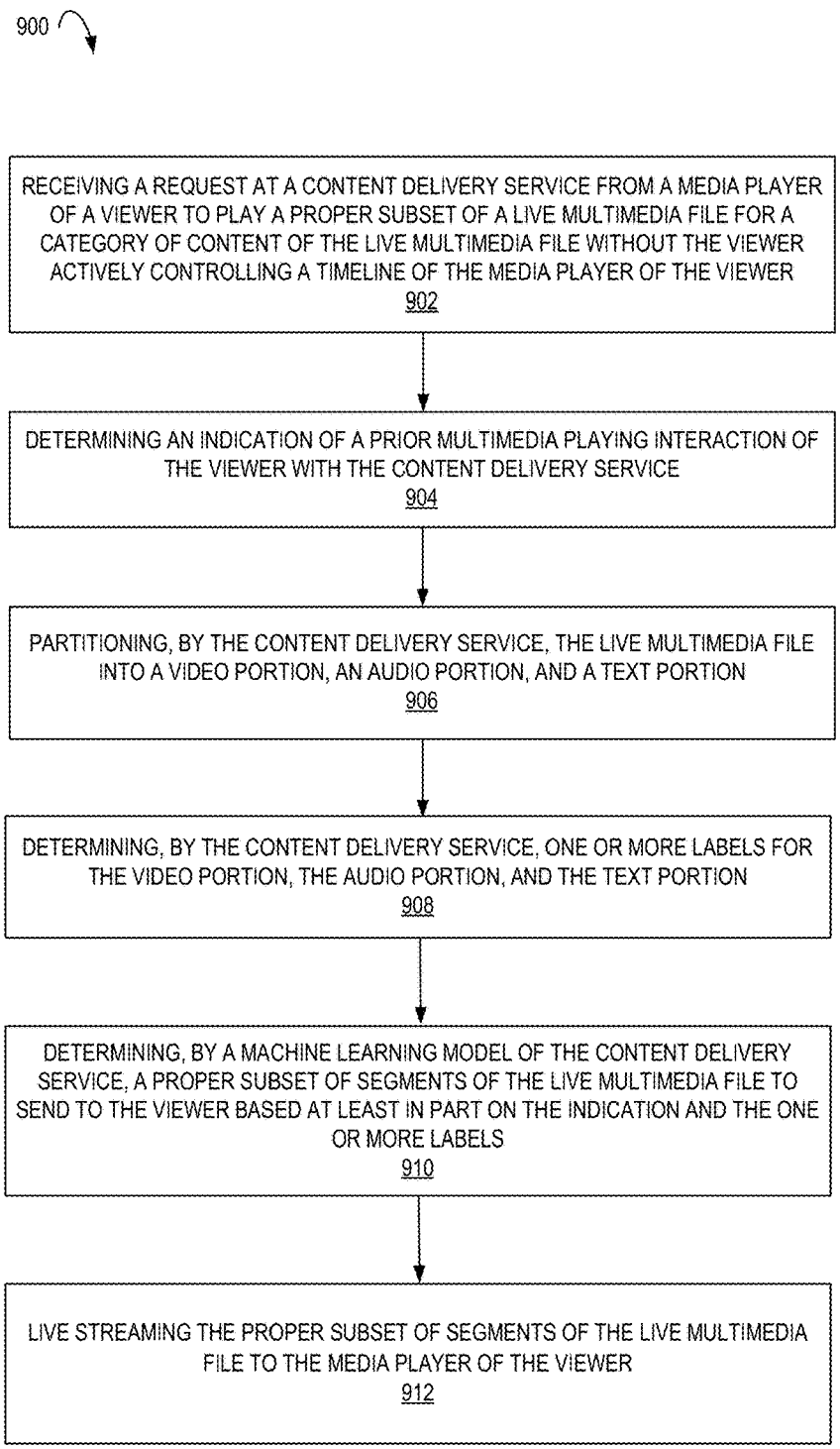
FIG. 9 is a flow diagram illustrating operations of a method for determining, by a machine learning model of a content delivery service, a proper subset of segments of a live multimedia file to send to a viewer based at least in part on an indication of a prior multimedia playing interaction of the viewer with the content delivery service and one or more labels for the live multimedia file according to some embodiments.

FIG. 9 is a flow diagram illustrating operations of a method for determining, by a machine learning model of a content delivery service, a proper subset of segments of a live multimedia file to send to a viewer based at least in part on an indication of a prior multimedia playing interaction of the viewer with the content delivery service and one or more labels for the live multimedia file according to some embodiments. Some or all of the operations 900 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 900 are performed by content delivery system/service 102 of the other figures.

The operations 900 include, at block 902, receiving a request at a content delivery service from a media player of a viewer to play a (for example, unidentified and/or undetermined (e.g., at and/or before that time)) proper subset of a live multimedia file for a category of content of the live multimedia file without the viewer actively controlling a timeline of the media player of the viewer. The operations 900 further include, at block 904, determining an indication of a prior multimedia playing interaction of the viewer with the content delivery service. The operations 900 further include, at block 906, partitioning, by the content delivery service, the live multimedia file into a video portion, an audio portion, and a text portion. The operations 900 further include, at block 908, determining, by the content delivery service, one or more labels for the video portion, the audio portion, and the text portion. The operations 900 further include, at block 910, determining, by a machine learning model of the content delivery service, a proper subset of segments of the live multimedia file to send to the viewer based at least in part on the indication and the one or more labels. The operations 900 further include, at block 912, live streaming the proper subset of segments of the live multimedia file to the media player of the viewer.

Exemplary environments, systems, etc. that the above may be used in are detailed below.

At least some embodiments of the disclosed technologies can be described in view of the following examples:

Example 1. A computer-implemented method comprising:
receiving a request at a content delivery service from a media player of a viewer to play a proper subset of a live multimedia file for a category of content of the live multimedia file without the viewer actively controlling a timeline of the media player of the viewer; determining an indication of a prior multimedia playing interaction of the viewer with the content delivery service;
partitioning, by the content delivery service, the live multimedia file into a video portion, an audio portion, and a text portion;
determining, by the content delivery service, one or more labels for the video portion, the audio portion, and the text portion;
determining, by a machine learning model of the content delivery service, a proper subset of segments of the live multimedia file to send to the viewer based at least in part on the indication and the one or more labels; and
live streaming the proper subset of segments of the live multimedia file to the media player of the viewer.

Example 2. The computer-implemented method of example 1, wherein the request indicates the category of content is a highlight category.

Example 3. The computer-implemented method of example 1, further comprising:
receiving a second request at the content delivery service from a media player of a second viewer to play a proper subset of the live multimedia file for the category of content of the live multimedia file without the second viewer actively controlling a timeline of the media player of the second viewer;
determining a second indication of a prior multimedia playing interaction of the second viewer with the content delivery service;
determining, by the machine learning model of the content delivery service, a different proper subset of segments of the live multimedia file to send to the second viewer based at least in part on the second indication and the one or more labels; and
live streaming the different proper subset of segments of the live multimedia file to the media player of the second viewer.

Example 4. A computer-implemented method comprising:
receiving a request at a content delivery service from a media player of a viewer to play a proper subset of a multimedia file for a category of content of the multimedia file;
determining an indication of a prior multimedia playing interaction of the viewer with the content delivery service;
partitioning, by the content delivery service, the multimedia file into a video portion, an audio portion, and a text portion;
determining, by the content delivery service, one or more labels for the video portion, the audio portion, and the text portion;
determining, by a machine learning model of the content delivery service, a proper subset of segments of the multimedia file to send to the viewer based at least in part on the indication and the one or more labels; and
transmitting the proper subset of segments of the multimedia file to the media player of the viewer.

Example 5. The computer-implemented method of example 4, wherein the request indicates the category of content is a highlight category.

Example 6. The computer-implemented method of example 4, wherein the request indicates the category of content is a musical category.

Example 7. The computer-implemented method of example 4, further comprising:
receiving a second request at the content delivery service from a media player of a second viewer to play a proper subset of the multimedia file for the category of content of the multimedia file;

determining a second indication of a prior multimedia playing interaction of the second viewer with the content delivery service;

determining, by the machine learning model of the content delivery service, a different proper subset of segments of multimedia file to send to the second viewer based at least in part on the second indication and the one or more labels; and transmitting the different proper subset of segments of the multimedia file to the media player of the second viewer.

Example 8. The computer-implemented method of example 4, further comprising:

displaying a graphical user interface to the viewer with a skip scene interface element; and skipping a corresponding scene of a plurality of scenes in the proper subset of segments of the multimedia file by the media player of the viewer in response to the viewer selecting the skip scene interface element.

Example 9. The computer-implemented method of example 4, wherein the proper subset of segments of the multimedia file includes a proper subset of video segments and a corresponding proper subset of audio segments that are different than a proper subset of audio segments in the multimedia file for the proper subset of video segments.

Example 10. The computer-implemented method of example 4, wherein the request indicates the category of content is a highlight of a previous season of a multiple season series.

Example 11. The computer-implemented method of example 4, further comprising
displaying a graphical user interface to the viewer with an interface element to select the
category of content from a plurality of categories of content.

Example 12. The computer-implemented method of example 11, wherein the plurality of categories of content includes a highlight category.

Example 13. The computer-implemented method of example 4, wherein the multimedia file is a live multimedia file, and the request indicates the category of content is a highlight of a previously streamed subset of the live multimedia file that was not transmitted to the media player of the viewer.

Example 14. The computer-implemented method of example 13, wherein the request indicates the viewer is late to a start of live streaming of the live multimedia file.

Example 15. A system comprising:

an intake service implemented by a first one or more electronic devices, the intake service including instructions that upon execution cause the first one or more electronic devices to intake a multimedia file; and a content delivery service implemented by a second one or more electronic devices, the content delivery service including instructions that upon execution cause the second one or more electronic devices to perform operations comprising:

receiving a request at the content delivery service from a media player of a viewer to play a proper subset of the multimedia file for a category of content of the multimedia file, determining an indication of a prior multimedia playing interaction of the viewer, partitioning the multimedia file into a video portion, an audio portion, and a text portion, determining one or more labels for the video portion, the audio portion, and the text portion, determining, by a machine learning model of the content delivery service, a proper subset of segments of the multimedia file to send to the viewer based at least in part on the indication and the one or more labels, and transmitting the proper subset of segments of the multimedia file to the media player of the viewer.

Example 16. The system of example 15, wherein the request indicates the category of content is a highlight category.

Example 17. The system of example 15, wherein the content delivery service further includes instructions that upon execution cause the second one or more electronic devices to perform operations further comprising:

receiving a second request at the content delivery service from a media player of a second viewer to play a proper subset of the multimedia file for the category of content of the multimedia file;

determining a second indication of a prior multimedia playing interaction of the second viewer with the content delivery service;

determining, by the machine learning model of the content delivery service, a different proper subset of segments of multimedia file to send to the second viewer based at least in part on the second indication and the one or more labels; and transmitting the different proper subset of segments of the multimedia file to the media player of the second viewer.

Example 18. The system of example 15, wherein the proper subset of segments of the multimedia file includes a proper subset of video segments and a corresponding proper subset of audio segments that are different than a proper subset of audio segments in the multimedia file for the proper subset of video segments.

Example 19. The system of example 15, wherein the content delivery service further includes instructions that upon execution cause the second one or more electronic devices to perform operations further comprising:

displaying a graphical user interface to the viewer with an interface element to select the category of content from a plurality of categories of content.

Example 20. The system of example 15, wherein the multimedia file is a live multimedia file, and the request indicates the category of content is highlight of a previously streamed subset of the live multimedia file that was not transmitted to the media player of the viewer.

Figure 10:
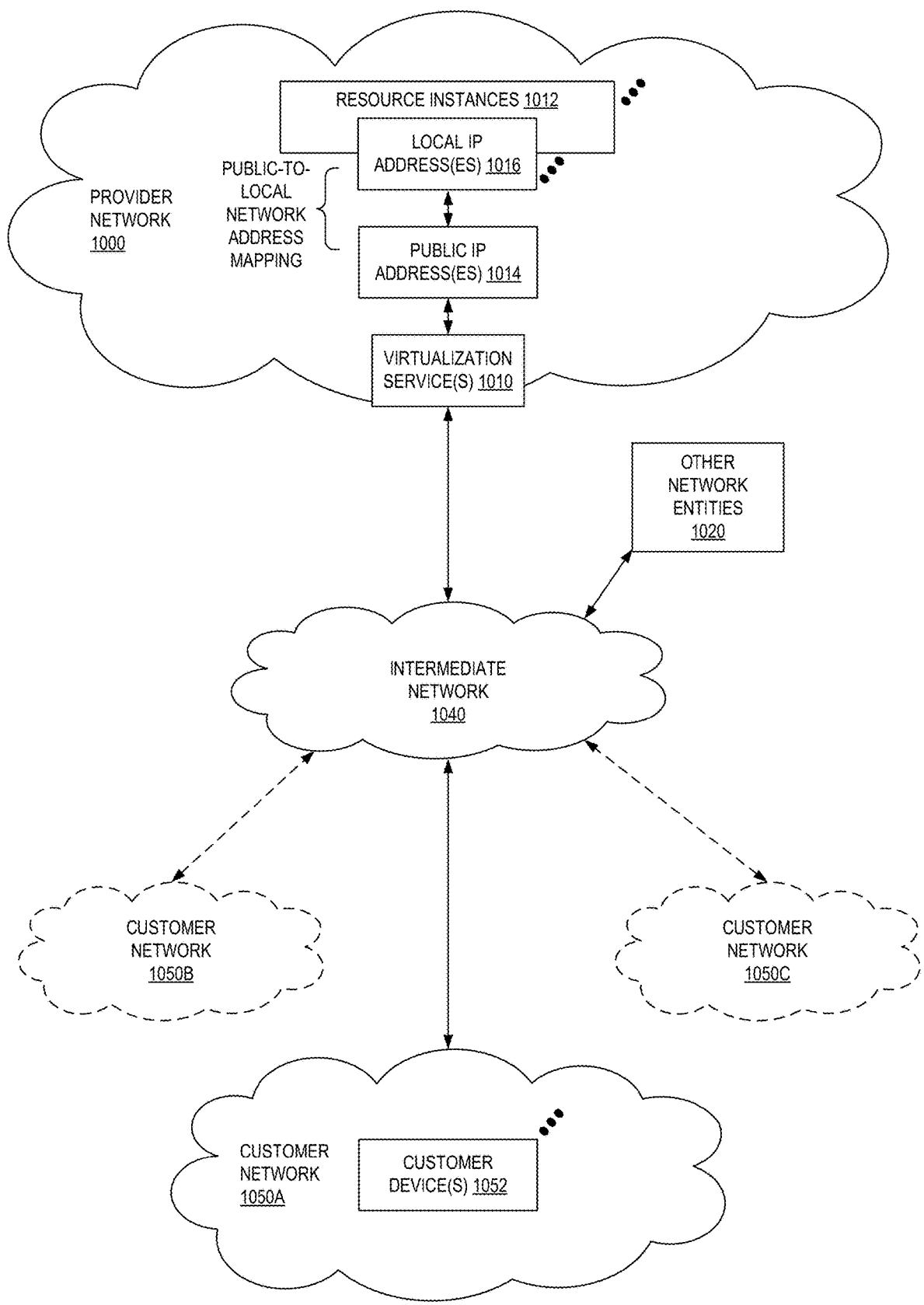
FIG. 10 illustrates an example provider network environment according to some embodiments.

FIG. 10 illustrates an example provider network (or "service provider system") environment according to some embodiments. A provider network 1000 may provide resource virtualization to customers via one or more virtualization services 1010 that allow customers to purchase, rent, or otherwise obtain instances 1012 of virtualized resources, including but not limited to computation and storage resources, implemented on devices within the provider network or networks in one or more data centers. Local Internet Protocol (IP) addresses 1016 may be associated with the resource instances 1012; the local IP addresses are the internal network addresses of the resource instances 1012 on the provider network 1000. In some embodiments, the provider network 1000 may also provide public IP addresses 1014 and/or public IP address ranges (e.g., Internet Protocol version 4 (IPv4) or Internet Protocol version 6 (IPv6) addresses) that customers may obtain from the provider 1000.

Conventionally, the provider network 1000, via the virtualization services 1010, may allow a customer of the service provider (e.g., a customer that operates one or more client networks 1050A-1050C including one or more customer device(s) 1052) to dynamically associate at least some public IP addresses 1014 assigned or allocated to the customer with particular resource instances 1012 assigned to the customer. The provider network 1000 may also allow the customer to remap a public IP address 1014, previously mapped to one virtualized computing resource instance 1012 allocated to the customer, to another virtualized computing resource instance 1012 that is also allocated to the customer. Using the virtualized computing resource instances 1012 and public IP addresses 1014 provided by the service provider, a customer of the service provider such as the operator of customer network(s) 1050A-1050C may, for example, implement customer-specific applications and present the customer's applications on an intermediate network 1040, such as the Internet. Other network entities 1020 on the intermediate network 1040 may then generate traffic to a destination public IP address 1014 published by the customer network(s) 1050A-1050C; the traffic is routed to the service provider data center, and at the data center is routed, via a network substrate, to the local IP address 1016 of the virtualized computing resource instance 1012 currently mapped to the destination public IP address 1014. Similarly, response traffic from the virtualized computing resource instance 1012 may be routed via the network substrate back onto the intermediate network 1040 to the source entity 1020.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 1000; a customer may then assign their allocated public IP addresses to particular resource instances allocated to the customer. These public IP addresses may be referred to as customer public IP addresses, or simply customer IP addresses. Instead of being assigned by the provider network 1000 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 11:
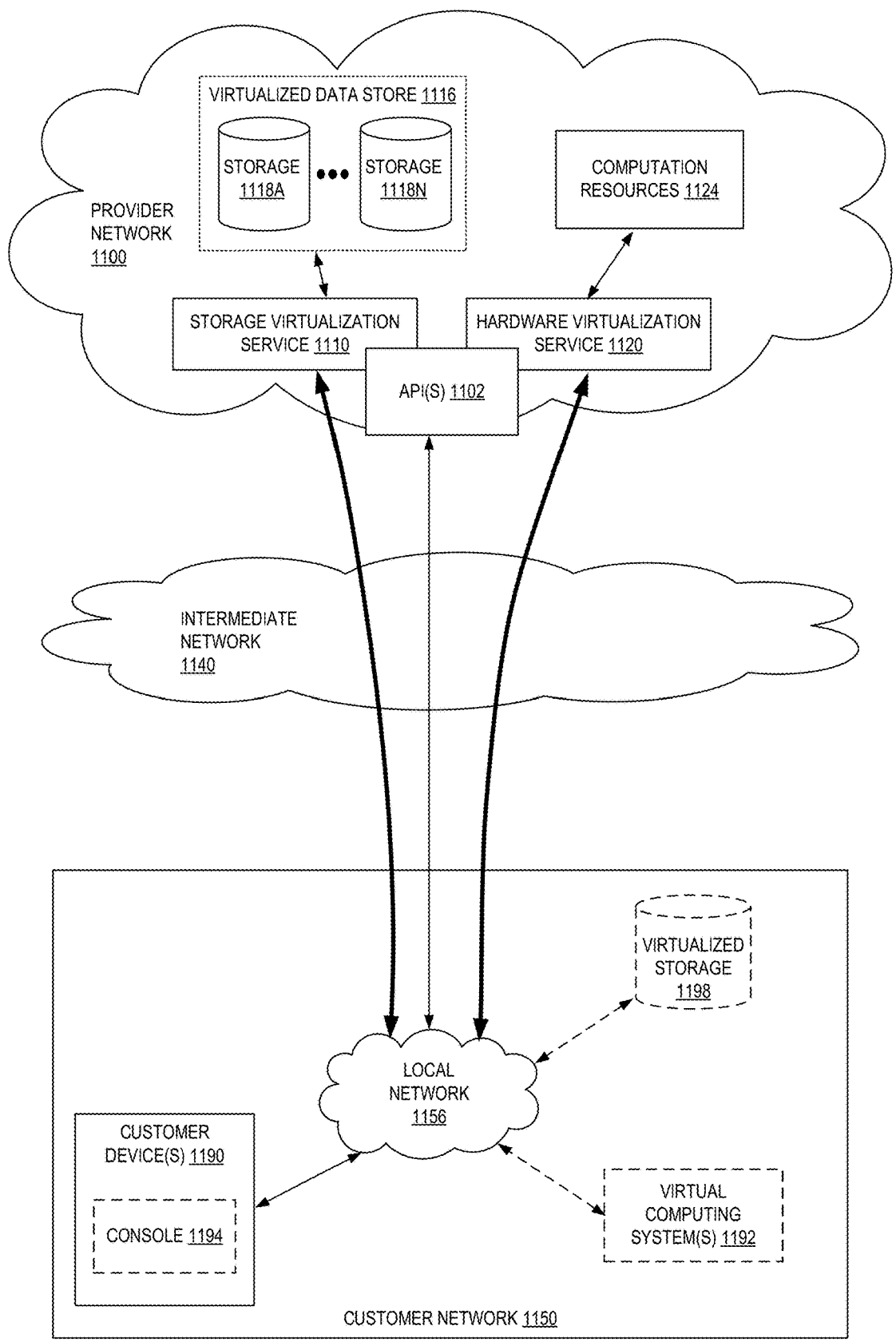
FIG. 11 is a block diagram of an example provider network that provides a storage service and a hardware virtualization service to customers according to some embodiments.

FIG. 11 is a block diagram of an example provider network that provides a storage service and a hardware virtualization service to customers, according to some embodiments. Hardware virtualization service 1120 provides multiple computation resources 1124 (e.g., VMs) to customers. The computation resources 1124 may, for example, be rented or leased to customers of the provider network 1100 (e.g., to a customer that implements customer network 1150). Each computation resource 1124 may be provided with one or more local IP addresses. Provider network 1100 may be configured to route packets from the local IP addresses of the computation resources 1124 to public Internet destinations, and from public Internet sources to the local IP addresses of computation resources 1124.

Provider network 1100 may provide a customer network 1150, for example coupled to intermediate network 1140 via local network 1156, the ability to implement virtual computing systems 1192 via hardware virtualization service 1120 coupled to intermediate network 1140 and to provider network 1100. In some embodiments, hardware virtualization service 1120 may provide one or more APIs 1102, for example a web services interface, via which a customer network 1150 may access functionality provided by the hardware virtualization service 1120, for example via a console 1194 (e.g., a web-based application, standalone application, mobile application, etc.). In some embodiments, at the provider network 1100, each virtual computing system 1192 at customer network 1150 may correspond to a computation resource 1124 that is leased, rented, or otherwise provided to customer network 1150.

From an instance of a virtual computing system 1192 and/or another customer device 1190 (e.g., via console 1194), the customer may access the functionality of storage service 1110, for example via one or more APIs 1102, to access data from and store data to storage resources 1118A-1118N of a virtual data store 1116 (e.g., a folder or "bucket", a virtualized volume, a database, etc.) provided by the provider network 1100. In some embodiments, a virtualized data store gateway (not shown) may be provided at the customer network 1150 that may locally cache at least some data, for example frequently accessed or critical data, and that may communicate with storage service 1110 via one or more communications channels to upload new or modified data from a local cache so that the primary store of data (virtualized data store 1116) is maintained. In some embodiments, a user, via a virtual computing system 1192 and/or on another customer device 1190, may mount and access virtual data store 1116 volumes via storage service 1110 acting as a storage virtualization service, and these volumes may appear to the user as local (virtualized) storage 1198.

While not shown in FIG. 11, the virtualization service(s) may also be accessed from resource instances within the provider network 1100 via API(s) 1102. For example, a customer, appliance service provider, or other entity may access a virtualization service from within a respective virtual network on the provider network 1100 via an API 1102 to request allocation of one or more resource instances within the virtual network or within another virtual network.

Illustrative System

Figure 12:
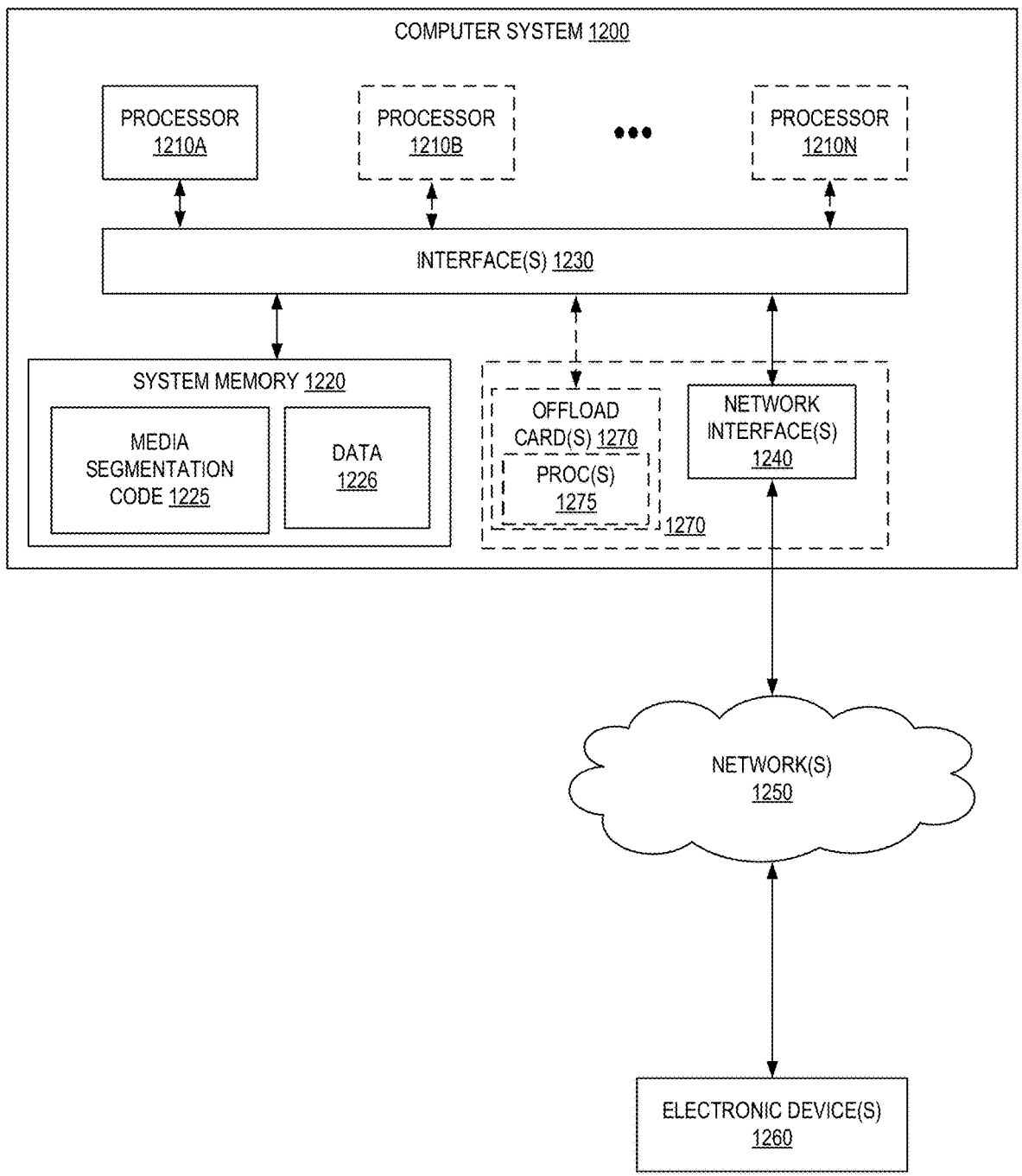
FIG. 12 is a block diagram illustrating an example computer system that may be used in some embodiments.

In some embodiments, a system that implements a portion or all of the techniques for content indexing as described herein may include a general-purpose computer system that includes or is configured to access one or more computer-accessible media, such as computer system 1200 illustrated in FIG. 12. In the illustrated embodiment, computer system 1200 includes one or more processors 1210 coupled to a system memory 1220 via an input/output (I/O) interface 1230. Computer system 1200 further includes a network interface 1240 coupled to I/O interface 1230. While FIG. 12 shows computer system 1200 as a single computing device, in various embodiments a computer system 1200 may include one computing device or any number of computing devices configured to work together as a single computer system 1200.

In various embodiments, computer system 1200 may be a uniprocessor system including one processor 1210, or a multiprocessor system including several processors 1210 (e.g., two, four, eight, or another suitable number). Processors 1210 may be any suitable processors capable of executing instructions. For example, in various embodiments, processors 1210 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1210 may commonly, but not necessarily, implement the same ISA.

System memory 1220 may store instructions and data accessible by processor(s) 1210. In various embodiments, system memory 1220 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1220 as media segmentation code 1225 and data 1226.

In one embodiment, I/O interface 1230 may be configured to coordinate I/O traffic between processor 1210, system memory 1220, and any peripheral devices in the device, including network interface 1240 or other peripheral interfaces. In some embodiments, I/O interface 1230 may perform any necessary protocol, timing, or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments some or all of the functionality of I/O interface 1230, such as an interface to system memory 1220, may be incorporated directly into processor 1210.

Network interface 1240 may be configured to allow data to be exchanged between computer system 1200 and other devices 1260 attached to a network or networks 1250, such as other computer systems or devices as illustrated in FIG. 1, for example. In various embodiments, network interface 1240 may support communication via any suitable wired or wireless general data networks, such as types of Ethernet network, for example. Additionally, network interface 1240 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1200 includes one or more offload cards 1270 (including one or more processors 1275, and possibly including the one or more network interfaces 1240) that are connected using an I/O interface 1230 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1200 may act as a host electronic device (e.g., operating as part of a hardware virtualization service) that hosts compute instances, and the one or more offload cards 1270 execute a virtualization manager that can manage compute instances that execute on the host electronic device. As an example, in some embodiments the offload card(s) 1270 can perform compute instance management operations such as pausing and/or un-pausing compute instances, launching and/or terminating compute instances, performing memory transfer/copying operations, etc. These management operations may, in some embodiments, be performed by the offload card(s) 1270 in coordination with a hypervisor (e.g., upon a request from a hypervisor) that is executed by the other processors 1210A-1210N of the computer system 1200. However, in some embodiments the virtualization manager implemented by the offload card(s) 1270 can accommodate requests from other entities (e.g., from compute instances themselves), and may not coordinate with (or service) any separate hypervisor.

In some embodiments, system memory 1220 may be one embodiment of a computer-accessible medium configured to store program instructions and data as described above. However, in other embodiments, program instructions and/or data may be received, sent, or stored upon different types of computer-accessible media. Generally speaking, a computer-accessible medium may include non-transitory storage media or memory media such as magnetic or optical media, e.g., disk or DVD/CD coupled to computer system 1200 via I/O interface 1230. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1200 as system memory 1220 or another type of memory. Further, a computer-accessible medium may include transmission media or signals such as electrical, electromagnetic, or digital signals, conveyed via a communication medium such as a network and/or a wireless link, such as may be implemented via network interface 1240.

Figure 13:
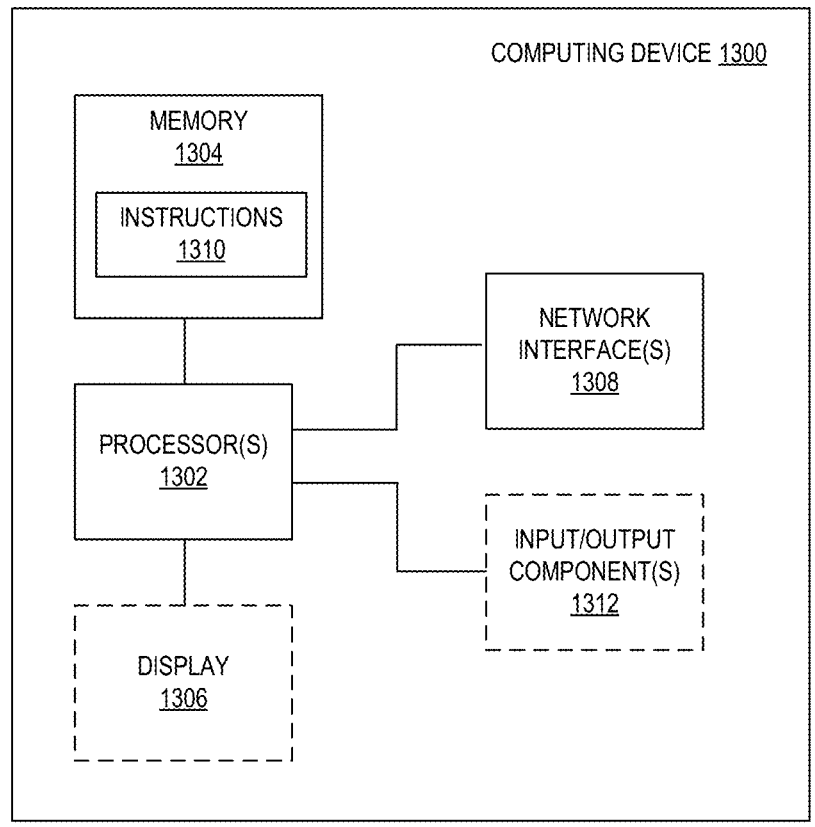
FIG. 13 illustrates a logical arrangement of a set of general components of an exemplary computing device that can be utilized in accordance with various embodiments.

FIG. 13 illustrates a logical arrangement of a set of general components of an example computing device 1300. Generally, a computing device 1300 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1302 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1304) to store code (for example, instructions 1310, e.g., which implement a content delivery service as disclosed herein), and a set of one or more wired or wireless network interfaces 1308 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1304) of a given electronic device typically stores code (e.g., instructions 1310) for execution on the set of one or more processors 1302 of that electronic device. One or more parts of various embodiments may be implemented using different combinations of software, firmware, and/or hardware.

A computing device 1300 can include some type of display element 1306, such as a touch screen or liquid crystal display (LCD), although many devices such as portable media players might convey information via other means, such as through audio speakers, and other types of devices such as server end stations may not have a display element 1306 at all. As discussed, some computing devices used in some embodiments include at least one input and/or output component(s) 1312 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

Figure 14:
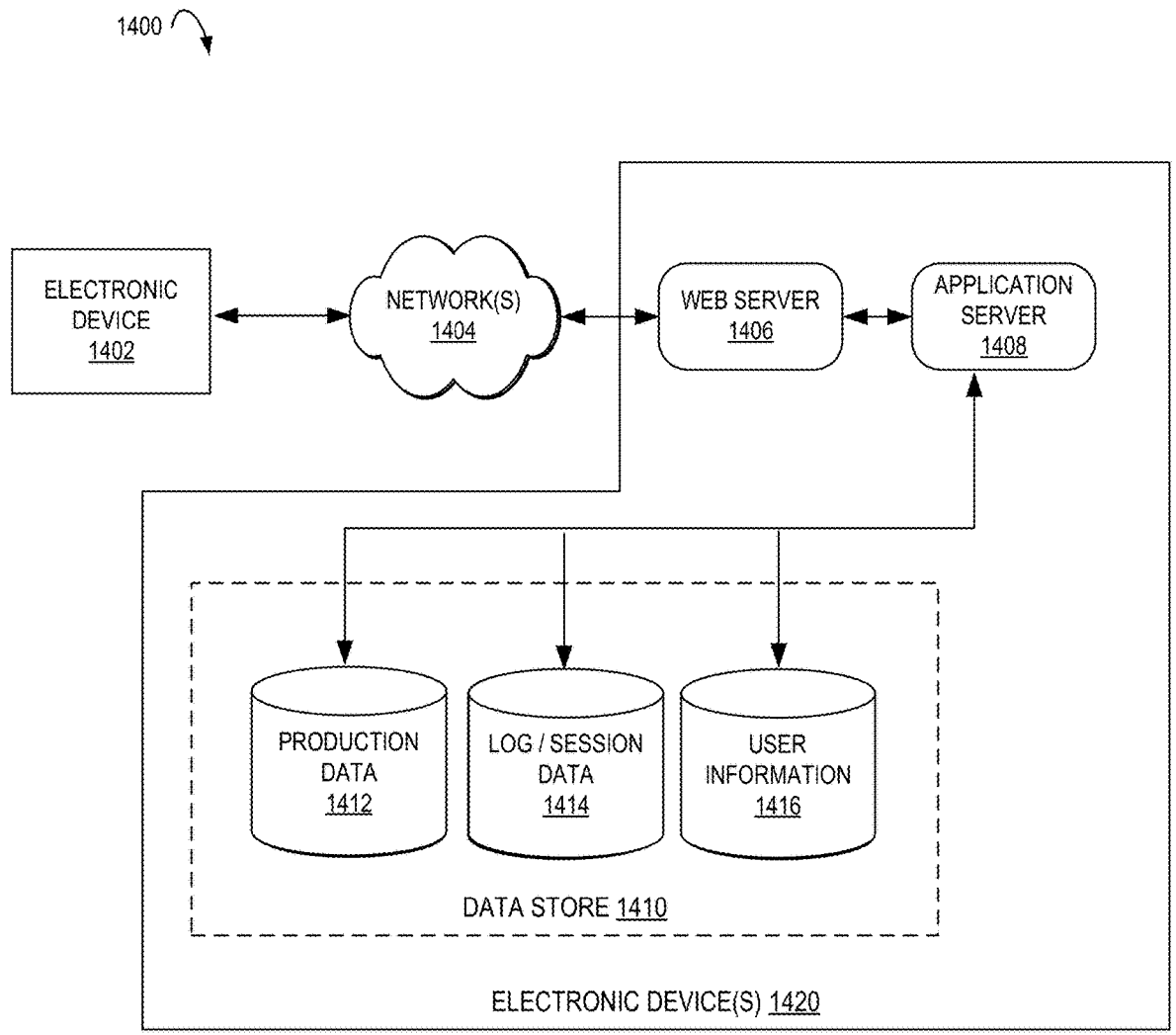
FIG. 14 illustrates an example of an environment for implementing aspects in accordance with various embodiments.

As discussed, different approaches can be implemented in various environments in accordance with the described embodiments. For example, FIG. 14 illustrates an example of an environment 1400 for implementing aspects in accordance with various embodiments. For example, in some embodiments messages are HyperText Transfer Protocol (HTTP) requests that are received by a web server (e.g., web server 1406), and the users, via electronic devices, may interact with the provider network via a web portal provided via the web server 1406 and application server 1408. As will be appreciated, although a web-based environment is used for purposes of explanation, different environments may be used, as appropriate, to implement various embodiments. The system includes an electronic client device 1402, which may also be referred to as a client device and can be any appropriate device operable to send and receive requests, messages, or information over an appropriate network 1404 and convey information back to a user of the device 1402. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1404 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1404 includes the Internet, as the environment includes a web server 1406 for receiving requests and serving content in response thereto, although for other networks an alternative device serving a similar purpose could be used, as would be apparent to one of ordinary skill in the art.

The illustrative environment includes at least one application server 1408 and a data store 1410. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed, or clustered environment. The application server 1408 can include any appropriate hardware and software for integrating with the data store 1410 as needed to execute aspects of one or more applications for the client device 1402 and handling a majority of the data access and business logic for an application. The application server 1408 provides access control services in cooperation with the data store 1410 and is able to generate content such as text, graphics, audio, video, etc., to be transferred to the client device 1402, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1402 and the application server 1408, can be handled by the web server 1406. It should be understood that the web server 1406 and application server 1408 are not required and are merely example components, as structured code discussed herein can be executed on any appropriate device or host machine as discussed elsewhere herein.

The data store 1410 can include several separate data tables, databases, or other data storage mechanisms and media for storing data relating to a particular aspect. For example, the data store illustrated includes mechanisms for storing production data 1412 and user information 1416, which can be used to serve content for the production side. The data store 1410 also is shown to include a mechanism for storing log or session data 1414. It should be understood that there can be many other aspects that may need to be stored in the data store, such as page image information and access rights information, which can be stored in any of the above listed mechanisms as appropriate or in additional mechanisms in the data store 1410. The data store 1410 is operable, through logic associated therewith, to receive instructions from the application server 1408 and obtain, update, or otherwise process data in response thereto. In one example, a user might submit a search request for a certain type of item. In this case, the data store 1410 might access the user information 1416 to verify the identity of the user and can access a production data 1412 to obtain information about items of that type. The information can then be returned to the user, such as in a listing of results on a web page that the user is able to view via a browser on the user device 1402. Information for a particular item of interest can be viewed in a dedicated page or window of the browser.

The web server 1406, application server 1408, and/or data store 1410 may be implemented by one or more electronic devices 1420, which can also be referred to as electronic server devices or server end stations, and may or may not be located in different geographic locations. Each of the one or more electronic devices 1420 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 14. Thus, the depiction of the environment 1400 in FIG. 14 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program code, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 1118A-1118N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
    receiving a request at a content delivery service from a media player of a viewer to play a proper subset of a live multimedia file for a category of content that is a highlight of a previously streamed subset of the live multimedia file that was not transmitted to the media player of the viewer without the viewer actively controlling a timeline of the media player of the viewer;
    determining an indication of a prior multimedia playing interaction of the viewer with the content delivery service;
    partitioning, by the content delivery service, the live multimedia file into a video portion, an audio portion, and a text portion;
    determining, by the content delivery service, one or more labels for the video portion, the audio portion, and the text portion;
    determining, by a machine learning model of the content delivery service, a proper subset of segments of the live multimedia file to send to the viewer based at least in part on the indication and the one or more labels; and
    live streaming the proper subset of segments of the live multimedia file to the media player of the viewer.

2. The computer-implemented method of claim 1, further comprising:
    receiving a second request at the content delivery service from a media player of a second viewer to play a proper subset of the live multimedia file for the category of content of the live multimedia file without the second viewer actively controlling a timeline of the media player of the second viewer;
    determining a second indication of a prior multimedia playing interaction of the second viewer with the content delivery service;
    determining, by the machine learning model of the content delivery service, a different proper subset of segments of the live multimedia file to send to the second viewer based at least in part on the second indication and the one or more labels; and
    live streaming the different proper subset of segments of the live multimedia file to the media player of the second viewer.

3. The computer-implemented method of claim 1, wherein the request indicates the viewer is late to a start of live streaming of the live multimedia file.

4. A computer-implemented method comprising:
    receiving a request at a content delivery service from a media player of a viewer to play a proper subset of a live multimedia file for a category of content that is a highlight of a previously streamed subset of the live multimedia file that was not transmitted to the media player of the viewer;
    determining an indication of a prior multimedia playing interaction of the viewer with the content delivery service;
    partitioning, by the content delivery service, the live multimedia file into a video portion, an audio portion, and a text portion;

determining, by the content delivery service, one or more labels for the video portion, the audio portion, and the text portion;

determining, by a machine learning model of the content delivery service, a proper subset of segments of the live multimedia file to send to the viewer based at least in part on the indication and the one or more labels; and transmitting the proper subset of segments of the live multimedia file to the media player of the viewer.

5. The computer-implemented method of claim 4, wherein the request indicates the category of content is selected from a plurality of categories of content that also includes a musical category.

6. The computer-implemented method of claim 4, further comprising:

receiving a second request at the content delivery service from a media player of a second viewer to play a proper subset of the live multimedia file for the category of content of the live multimedia file;

determining a second indication of a prior multimedia playing interaction of the second viewer with the content delivery service;

determining, by the machine learning model of the content delivery service, a different proper subset of segments of the live multimedia file to send to the second viewer based at least in part on the second indication and the one or more labels; and transmitting the different proper subset of segments of the live multimedia file to the media player of the second viewer.

7. The computer-implemented method of claim 4, further comprising:

displaying a graphical user interface to the viewer with a skip scene interface element; and skipping a corresponding scene of a plurality of scenes in the proper subset of segments of the highlight of the live multimedia file by the media player of the viewer in response to the viewer selecting the skip scene interface element.

8. The computer-implemented method of claim 4, wherein the proper subset of segments of the live multimedia file includes a proper subset of video segments and a corresponding proper subset of audio segments that are different than a proper subset of audio segments in the live multimedia file for the proper subset of video segments.

9. The computer-implemented method of claim 4, further comprising displaying a graphical user interface to the viewer with an interface element to select the category of content from a plurality of categories of content.

10. The computer-implemented method of claim 4, wherein the request indicates the viewer is late to a start of live streaming of the live multimedia file.

11. The computer-implemented method of claim 7, further comprising displaying a timeline indicator to the viewer that indicates the skipping of the corresponding scene to a next scene of the highlight.

12. A system comprising:

an intake service implemented by a first one or more electronic devices, the intake service including instructions that upon execution cause the first one or more electronic devices to intake a live multimedia file; and a content delivery service implemented by a second one or more electronic devices, the content delivery service including instructions that upon execution cause the second one or more electronic devices to perform operations comprising:

receiving a request at the content delivery service from a media player of a viewer to play a proper subset of the live multimedia file for a category of content that is a highlight of a previously streamed subset of the live multimedia file that was not transmitted to the media player of the viewer, determining an indication of a prior multimedia playing interaction of the viewer, partitioning the live multimedia file into a video portion, an audio portion, and a text portion, determining one or more labels for the video portion, the audio portion, and the text portion, determining, by a machine learning model of the content delivery service, a proper subset of segments of the live multimedia file to send to the viewer based at least in part on the indication and the one or more labels, and transmitting the proper subset of segments of the live multimedia file to the media player of the viewer.

13. The system of claim 12, wherein the content delivery service further includes instructions that upon execution cause the second one or more electronic devices to perform operations further comprising:

receiving a second request at the content delivery service from a media player of a second viewer to play a proper subset of the live multimedia file for the category of content of the live multimedia file;

determining a second indication of a prior multimedia playing interaction of the second viewer with the content delivery service;

determining, by the machine learning model of the content delivery service, a different proper subset of segments of the live multimedia file to send to the second viewer based at least in part on the second indication and the one or more labels; and transmitting the different proper subset of segments of the live multimedia file to the media player of the second viewer.

14. The system of claim 12, wherein the proper subset of segments of the live multimedia file includes a proper subset of video segments and a corresponding proper subset of audio segments that are different than a proper subset of audio segments in the live multimedia file for the proper subset of video segments.

15. The system of claim 12, wherein the content delivery service further includes instructions that upon execution cause the second one or more electronic devices to perform operations further comprising:

displaying a graphical user interface to the viewer with an interface element to select the category of content from a plurality of categories of content.

16. The system of claim 12, wherein the request indicates the viewer is late to a start of live streaming of the live multimedia file.

17. A computer-implemented method comprising:

receiving a request at a content delivery service from a media player of a viewer to play a proper subset of a multimedia file for a category of content of the multimedia file;

determining an indication of a prior multimedia playing interaction of the viewer with the content delivery service;

partitioning, by the content delivery service, the multimedia file into a video portion, an audio portion, and a text portion;

determining, by the content delivery service, one or more labels for the video portion, the audio portion, and the text portion;

determining, by a machine learning model of the content delivery service, a proper subset of segments of the multimedia file to send to the viewer based at least in part on the indication and the one or more labels, wherein the proper subset of segments of the multimedia file includes a proper subset of video segments and a corresponding proper subset of audio segments that are different than a proper subset of audio segments in the multimedia file for the proper subset of video segments; and transmitting the proper subset of segments of the multimedia file to the media player of the viewer.

18. The computer-implemented method of claim 17, wherein the request indicates the category of content is a highlight category.

19. The computer-implemented method of claim 17, wherein the request indicates the category of content is a musical category.

20. The computer-implemented method of claim 17, wherein the request indicates the category of content is a highlight of a previous season of a multiple season series.

21. The computer-implemented method of claim 17, further comprising:

displaying a graphical user interface to the viewer with a skip scene interface element; and skipping a corresponding scene of a plurality of scenes in the proper subset of segments of the multimedia file by the media player of the viewer in response to the viewer selecting the skip scene interface element.

* * * * *